US011167203B2

United States Patent
Van Wagoner et al.

(10) Patent No.: US 11,167,203 B2
(45) Date of Patent: Nov. 9, 2021

(54) SYSTEM, METHOD AND APPARATUS FOR GOLF SIMULATION

(71) Applicant: TruGolf, Inc., Centerville, UT (US)

(72) Inventors: Earl Van Wagoner, West Jordan, UT (US); Steven R. Johnson, Centerville, UT (US)

(73) Assignee: TruGolf, Inc., Centerville, UT (US)

( * ) Notice: Subject to any disclaimer, the term of this patent is extended or adjusted under 35 U.S.C. 154(b) by 79 days.

(21) Appl. No.: 16/491,537

(22) PCT Filed: Mar. 6, 2018

(86) PCT No.: PCT/US2018/021204
§ 371 (c)(1),
(2) Date: Sep. 5, 2019

(87) PCT Pub. No.: WO2018/165196
PCT Pub. Date: Sep. 13, 2018

(65) Prior Publication Data
US 2020/0038742 A1    Feb. 6, 2020

Related U.S. Application Data

(60) Provisional application No. 62/467,372, filed on Mar. 6, 2017.

(51) Int. Cl.
*A63F 7/06* (2006.01)
*A63B 69/36* (2006.01)
*A63F 7/20* (2006.01)

(52) U.S. Cl.
CPC ........ *A63F 7/0628* (2013.01); *A63B 69/3658* (2013.01); *A63F 7/20* (2013.01)

(58) Field of Classification Search
USPC ..................................... 463/3; 473/223, 152
See application file for complete search history.

(56) References Cited

U.S. PATENT DOCUMENTS

| 4,150,825 A | * | 4/1979 | Wilson | A63B 24/0021 473/152 |
| 5,437,457 A | * | 8/1995 | Curchod | A63B 24/0021 434/252 |
| 5,443,260 A | * | 8/1995 | Stewart | A63B 69/0002 473/421 |

(Continued)

OTHER PUBLICATIONS

International Search Report for International Application No. PCT/US2018/021204, dated May 18, 2018, 2 pages.

(Continued)

*Primary Examiner* — Pierre E Elisca
(74) *Attorney, Agent, or Firm* — TraskBritt

(57) ABSTRACT

Embodiments of the present disclosure relate to simulation, generally, and in some embodiments, more specifically to simulating a flight path of a golf ball. In such embodiments, a computer may be adapted to determine a first trajectory of the golf ball based on one linear expression; determine variations based on a flight path of the golf ball according to a first plane and a second plane, the first plane and second plane having orthogonality; adjust the first trajectory based on the variations; and provide a virtual golf ball with a virtual flight path based on the adjusted trajectory.

20 Claims, 20 Drawing Sheets

(56) References Cited

U.S. PATENT DOCUMENTS

| | | | | |
|---|---|---|---|---|
| 5,938,545 A | * | 8/1999 | Cooper | A63B 69/3658 |
| | | | | 473/407 |
| 2004/0032970 A1 | * | 2/2004 | Kiraly | A63B 24/0021 |
| | | | | 382/103 |
| 2016/0306036 A1 | * | 10/2016 | Johnson | G01S 13/867 |

OTHER PUBLICATIONS

International Written Opinion Report for International Application No. PCT/US2018/021204, dated May 18, 2018, 10 pages.

* cited by examiner

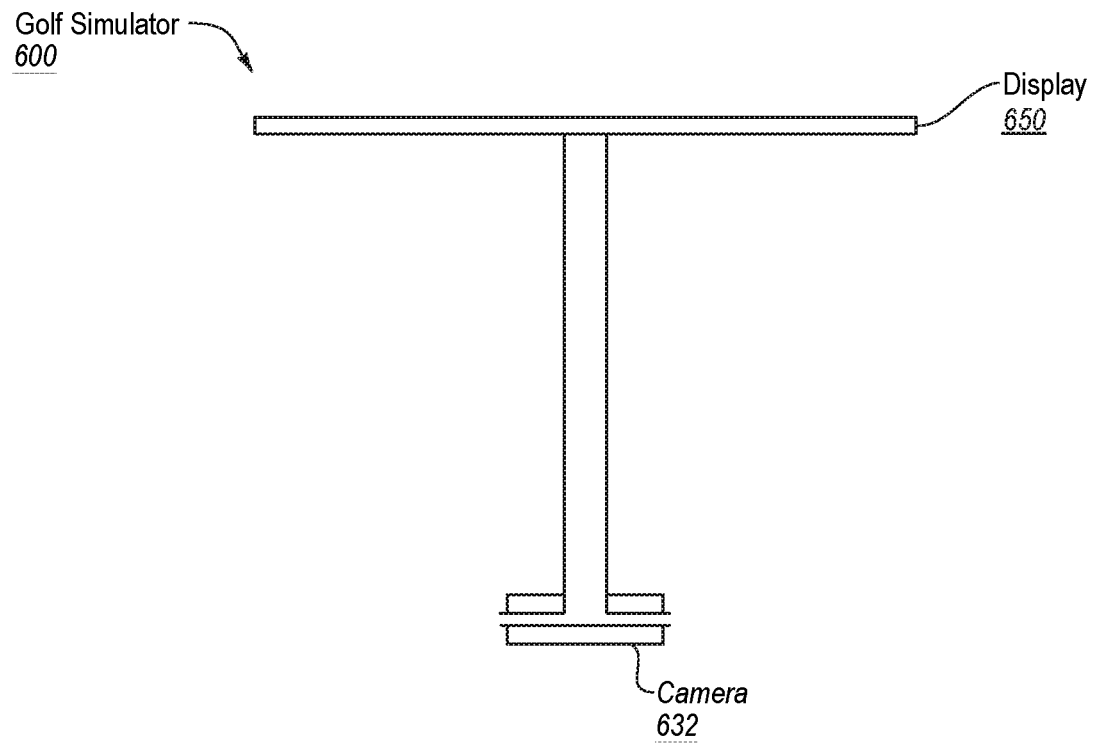
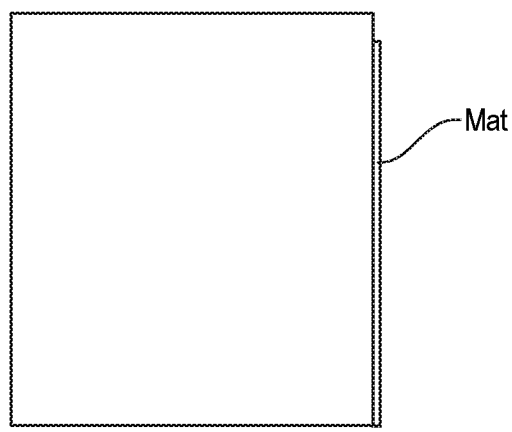
FIG. 16

SYSTEM, METHOD AND APPARATUS FOR GOLF SIMULATION

CROSS-REFERENCE TO RELATED APPLICATIONS

This application is a national phase entry under 35 U.S.C. § 371 of International Patent Application PCT/US2018/021204, filed Mar. 6, 2018, designating the United States of America and published in English as International Patent Publication WO 2018/165196 A1 on Sep. 13, 2018, which claims the benefit under Article 8 of the Patent Cooperation Treaty to U.S. Provisional Patent Application Ser. No. 62/467,372, filed Mar. 6, 2017, for "SYSTEM, METHOD AND APPARATUS FOR GOLF SIMULATION."

TECHNICAL FIELD

Embodiments of the disclosure relate to systems and apparatuses for golf simulation, and methods of operation and use of the same.

BACKGROUND

Golf simulators are used to simulate physical golf play in at least a partially virtual environment. In some golf simulators, a person using the simulator physically swings a golf club at a golf ball, strikes the golf ball, and then observes a simulated golf ball on a virtual golf course. Such simulators are, for example, incorporated into video games and training systems.

The quality of a user's experience with a golf simulator depends, among other things, on the simulation delay. Simulation delay is the delay from when a person strikes the golf ball to when they can actually observe the simulated golf ball on the golf simulator's display. For typical golf simulators the simulation delay is 4 or more seconds.

Accordingly, there is a need for a golf simulator without some or all of the drawbacks and limitations of the prior art golf simulators.

BRIEF SUMMARY

Some embodiments of the present disclosure may be related, generally, to a golf simulator. The golf simulator may include an image capture system and a computer. The image capture system may include a first camera and a second camera. In one embodiment the first camera and the second camera are adapted to be positioned in a stereographic arrangement. The computer may be adapted to generate simulation data of a golf ball flight path responsive to a club swing event by: determining a first trajectory of the golf ball based on one linear expression; determining variations responsive to a flight path of the golf ball according to a first plane and a second plane, the first plane and second plane having orthogonality; adjusting the first trajectory responsive to the variations; and generating simulation data indicative of a virtual golf ball with a virtual flight path responsive to the adjusted trajectory.

Some embodiments of the present disclosure may be related, generally, to a method of simulating a flight path of a golf ball. The method may include: determining a first trajectory of the golf ball based on one linear expression; determining variations based on a flight path of the golf ball according to a first plane and a second plane, the first plane and second plane having orthogonality; adjusting the first trajectory based on the variations; and providing a virtual golf ball with a virtual flight path based on the adjusted trajectory.

Some embodiments of the present disclosure may relate to, generally, a golf simulator. The golf simulator may include a stereographic image capture system, an image capture device, and a computer. The computer may be adapted to generate simulation data of a golf ball flight path responsive to a club swing event by: determining a first launch angle of the golf ball based on one linear expression; determining variations responsive to a flight path of the golf ball according to a first plane and a second plane, the first plane and second plane having orthogonality; adjusting the first launch based on the variations; and generating simulation data indicative of a virtual golf ball with a virtual flight path responsive to the adjusted launch angle.

Some embodiments of the present disclosure may relate to, generally, a method of simulating a golf ball flight path. The method may include determining a first launch angle of the golf ball based on one linear expression; determining variations based on a flight path of the golf ball according to a first plane and a second plane, the first plane and second plane having orthogonality; adjusting the first launch angle based on the variations; and providing a virtual golf ball with a virtual flight path based on the adjusted trajectory.

Some embodiments of the disclosure are directed to a golf simulator configured to detect a golf ball strike and simulate a flight path of the golf ball on a screen no later than 1 second after the golf ball strike.

Other embodiments of the disclosure are directed to a method of simulating a golf ball flight path. Using the method, a first trajectory of the golf ball is determined based on one linear expression. A weight is determined and the first trajectory is adjusted based on the weight to produce an adjusted trajectory. A virtual golf ball is provided with a virtual flight path based on the adjusted trajectory.

The foregoing and other features and advantages of the present disclosure will be made more apparent from the following descriptions, accompanying drawings, and appended claims. One of ordinary skill in the art, based on this disclosure, would understand that other aspects and advantages of the present disclosure exist.

BRIEF DESCRIPTION OF THE DRAWINGS

The purpose and advantages of the present invention will be apparent to one of ordinary skill in the art from the summary in conjunction with the accompanying drawings:

FIG. 16 is a top-down view of the golf simulator of FIG. 15, in accordance with an embodiment of the disclosure.

DETAILED DESCRIPTION

The illustrations presented herein are not meant to be actual views of any particular golf simulator apparatus, system or components thereof. They are merely idealized representations that are employed to describe the embodiments of the disclosure and are not intended to be to scale. Additionally, elements common between figures may retain the same numerical designation.

As used herein, an object or thing described as "physical" (such as a "physical golf club" or a "physical golf ball") means a tangible object in the real world. As used herein, an object or thing described a "virtual" (such as a "virtual golf course" or a "virtual golf ball") means an object (or objects) that is not physical or tangible, but rather is a computer system generated data construct or image based on such a construct that may be displayed on a screen. Finally, an object or thing that is described herein as "simulated" or as "a simulation" (such as a "simulated golf ball") means a physical object that is being represented as a virtual object.

Figure 1:
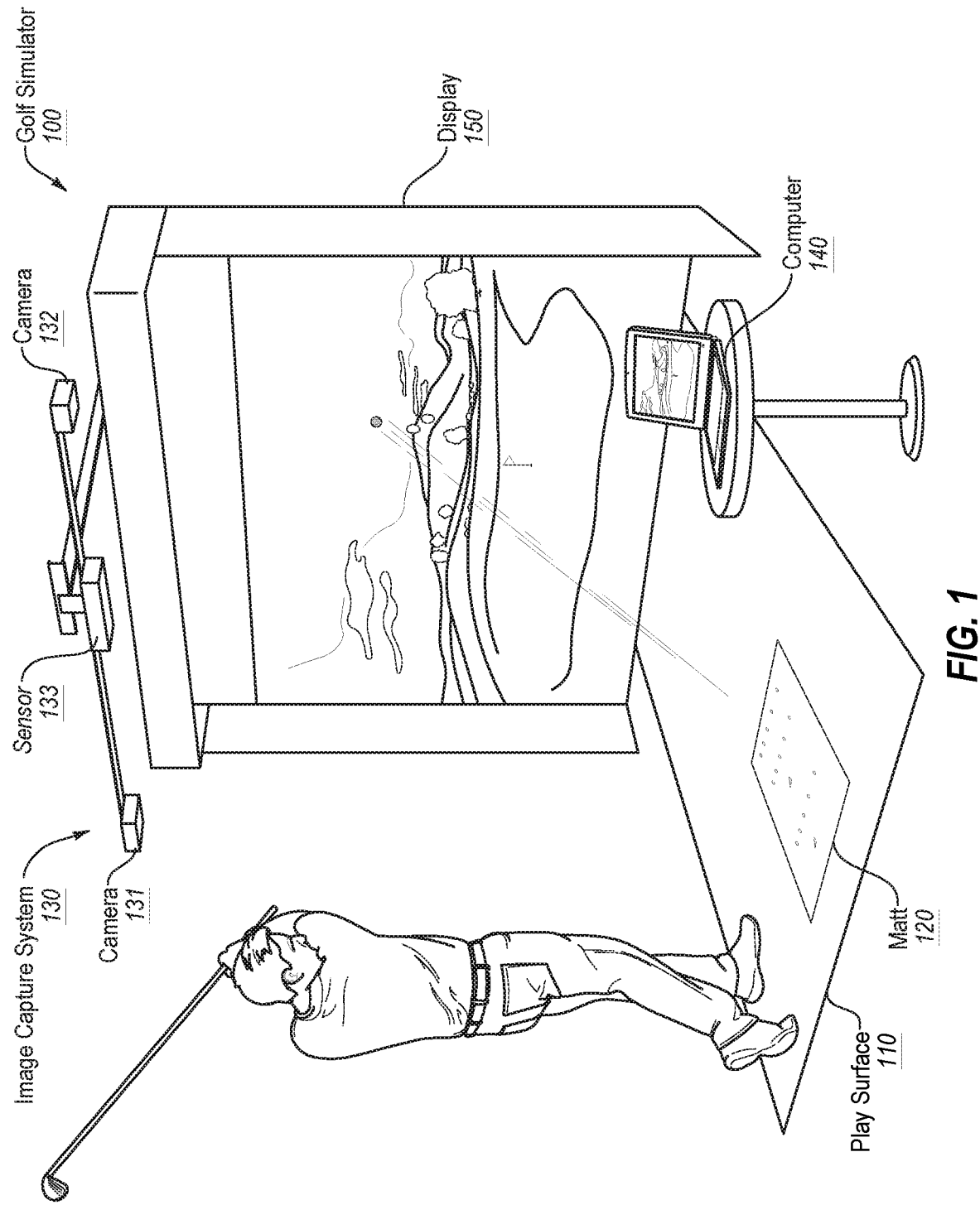
FIG. 1 is an isometric view of a golf simulator, in accordance with an embodiment of the disclosure.
Figure 2:
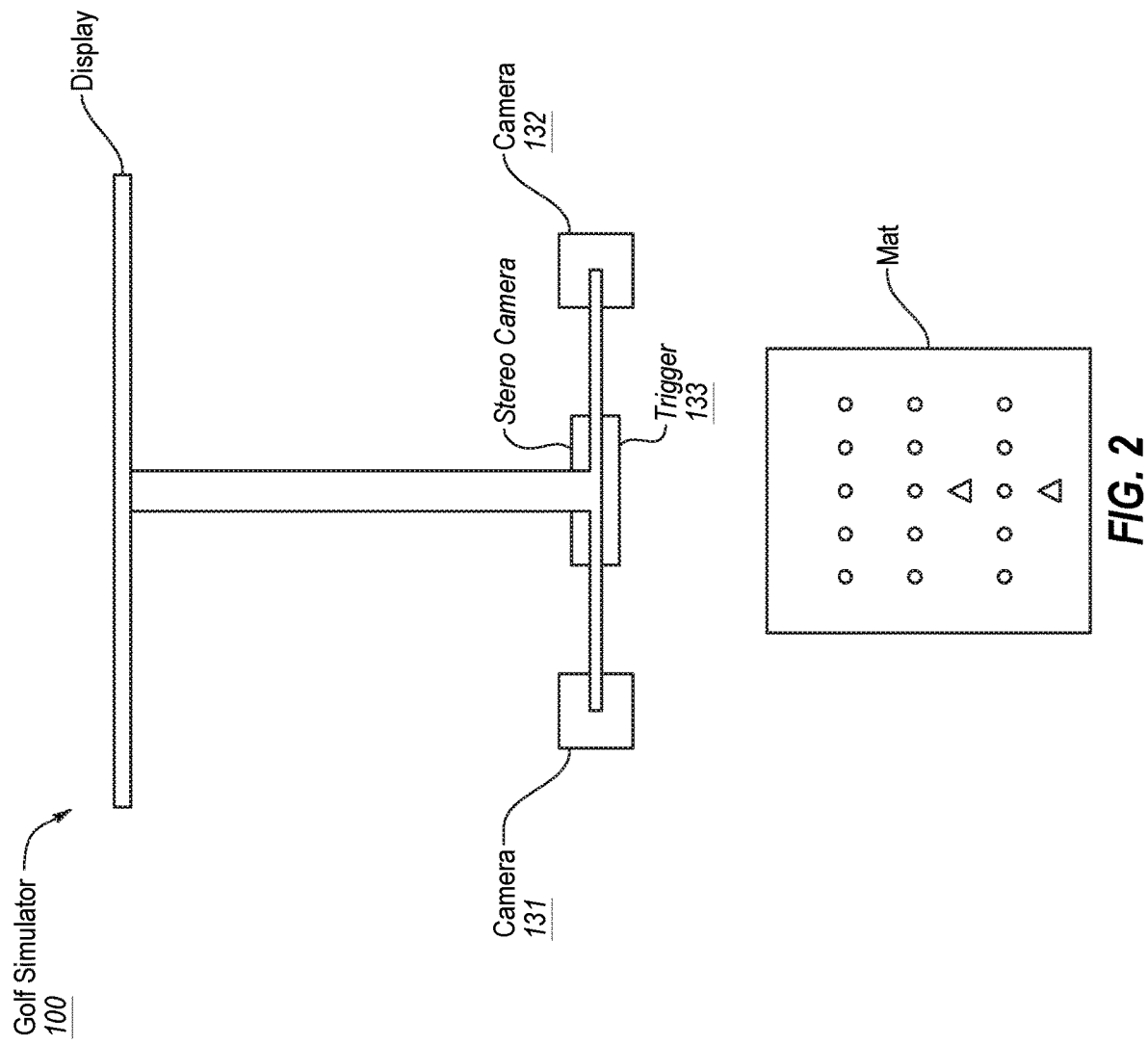
FIG. 2 is a top-down view of the golf simulator of FIG. 1, in accordance with an embodiment of the disclosure.

FIGS. 1 and 2 illustrate an embodiment of a golf simulator system 100 from an isometric and top-down perspective, respectively, in accordance with an embodiment of the disclosure. The golf simulator system 100 includes a playing surface 110, a hitting mat 120, an image capture system 130, a computer 140, and a display 150. The golf simulator system 100 may optionally include an enclosure, but none is shown. The playing surface 110 may be a stage or collapsible/expandable stage that has a top surface several inches to a foot above the floor, and may comprise synthetic grass or other material.

In one embodiment, the display 150 may include a projector configured to project images onto a screen. The display 150 may be operably coupled to the computer 140. Image data may be generated by the computer 140 and provided to the projector device for projection onto the screen. In other embodiments, the display 150 may be a liquid crystal display, plasma display, or rear-project display.

The image capture system 130 may include a left camera 131, a right camera 132, and a trigger 133. The image capture system 130 may be positioned by a support structure over the playing surface 110 so that the field of view captured by the cameras 131 and 132 includes the playing surface 110, hitting mat 120, and at least part of the likely flight path of a physical golf ball. The left camera 131, the right camera 132 and the trigger 133 may be arranged in a stereoscopic manner. In various embodiments of the disclosure the cameras 131 and 132 are digital cameras, preferably selected to have consistent, repeatable exposure periods.

The image capture system 130 may be operably coupled to the computer 140. Control signals for the image capture system 130, and more particularly the left camera 131, right camera 132 and trigger 133 may be generated by the computer 140 and communicated to the image capture system 130. The control signals may be related to any number of features and functions of the image capture system 130. In various embodiments of the disclosure, control signals are provided during a set-up process and are indicative of an exposure time of the left camera 131 and right camera 132. In one embodiment, the control signals may include shutter speed that would affect the exposure time of the cameras.

The trigger 133 may be configured to generate and communicate a control signal responsive to which the left camera 131 and the right camera 132 capture an image or images. In various embodiments, the trigger 133 is an asynchronous device, such as a motion sensor, that is positioned and configured to detect the motion of a physical golf ball, and to generate and communicate a control signal to the two cameras based on the aforementioned detection. In one embodiment, the trigger 133 is line photo-sensors behind a lens. In another embodiment, the trigger 133 may be a camera.

Upon receiving a control signal from the trigger 133, the cameras 131 and 132 may be configured to capture images. Each camera 131 and 132 may include a memory to store the captured images. In another embodiment, the cameras 131 and 132 may share a memory with allocated memory addresses for each camera. The computer 140 may be connected to the memory and configured to retrieve the stored image(s). In various embodiments of the disclosure, each time new images are stored in the memory, the new images overwrite any old images.

As mentioned above, the image capture system 130 may be operably coupled to the computer 140. Image capture data captured by the image capture system 130 may be transmitted to the computer 140. The image capture data may be streamed in real time or transferred after it is captured. In one embodiment, the computer may read image capture data direct from a camera to a memory for processing. In one embodiment, the image capture data may be formatted and stored (e.g., for later use), and the format of the stored image capture data may be one of MPEG, AVI, WMV, or MOV, or some other video format. In another embodiment, the format of the stored image capture data may be one of BITMAP, JPEG, TIFF, PNG, GIF, or in some other image format.

Figure 3:
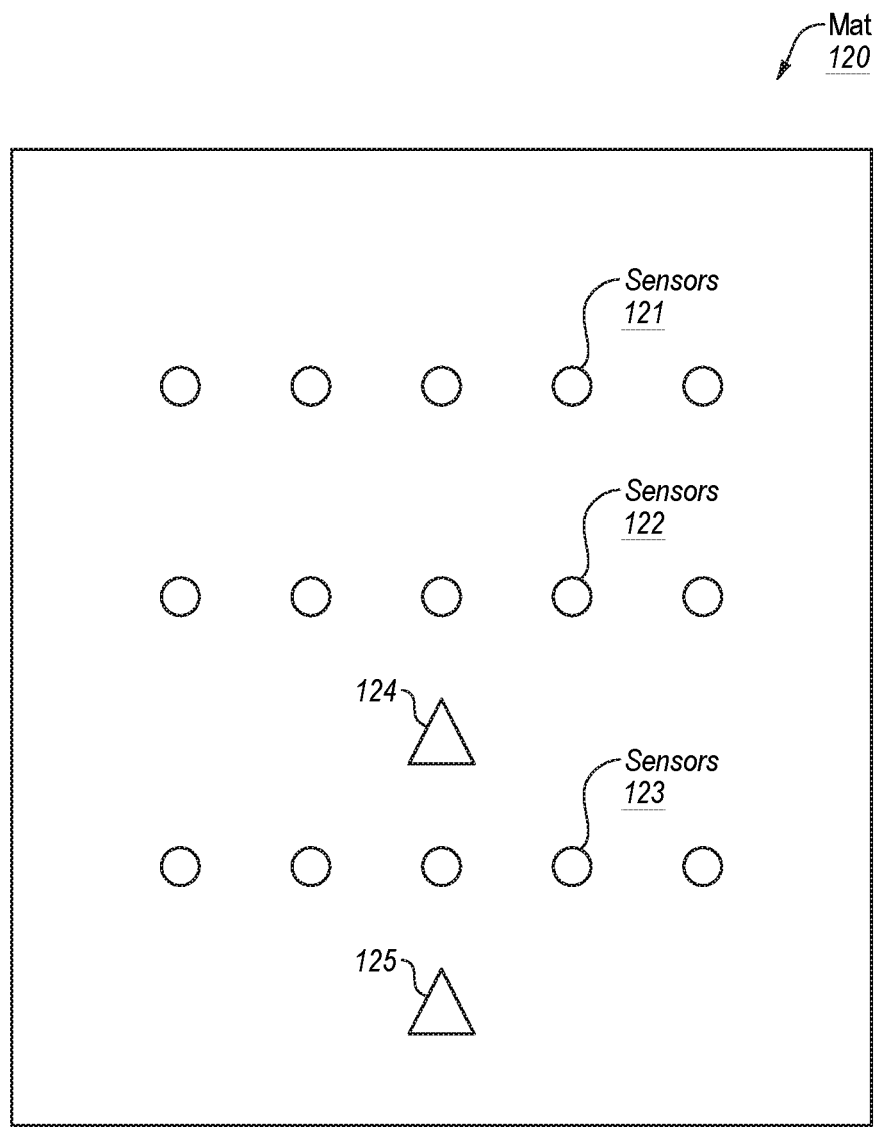
FIG. 3 is a top-down view of a hitting mat, in accordance with an embodiment of the disclosure.
Figure 4:
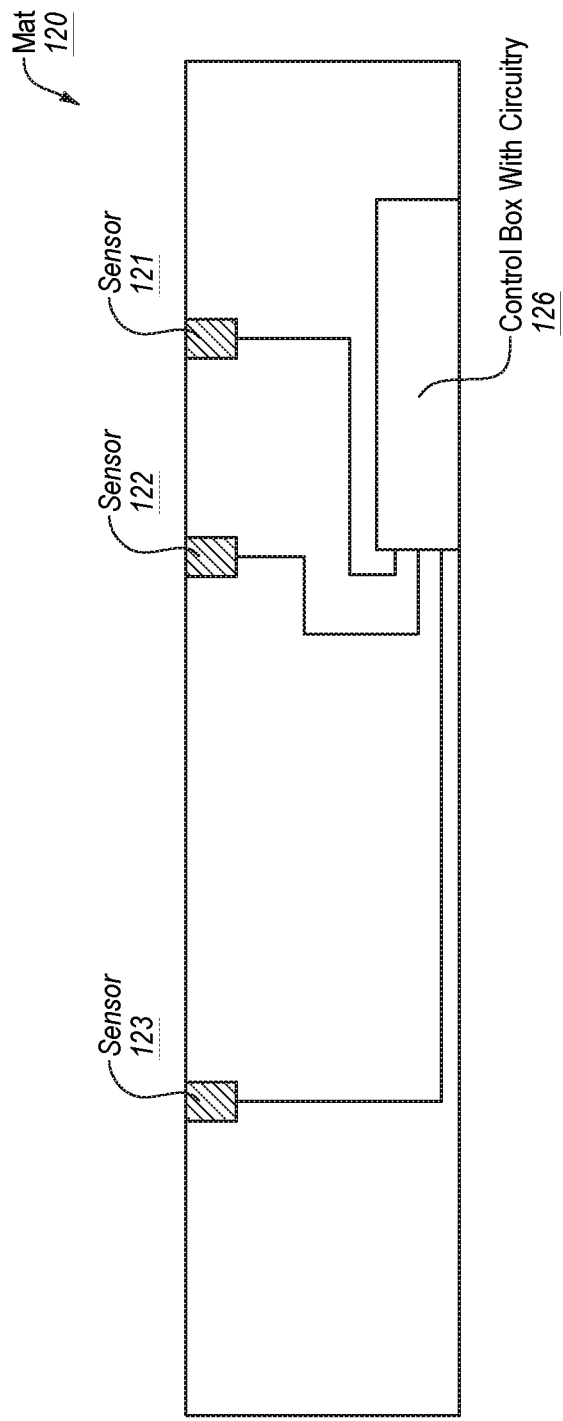
FIG. 4 is a side view of the hitting mat of FIG. 3, in accordance with an embodiment of the disclosure.

FIGS. 3 and 4 illustrate a hitting mat 120 according to an embodiment of the disclosure. In one embodiment, the hitting mat 120 is a rectangular box and it is disposed within the playing surface 110 such that a top surface of the hitting mat 120 is substantially flush with a top surface of the playing surface 110. Those of ordinary skill in the art will appreciate that the position of the hitting mat 120 may be adjusted such that the top surface of the hitting mat 120 is on a plane that is above or below the top surface of the playing surface 110, as well as adjusted to be at an angle relative to the top surface of the playing surface 110.

As illustrated in FIG. 3, the hitting mat 120 may include arrays of sensor arrays 121, 122 and 123, and also may include marker 124 and marker 125 for a physical golf ball to be placed. The hitting mat 120 may also include a control box 126 (FIG. 4) that includes control circuitry for the arrays of sensor arrays 121, 122 and 123. In various embodiments of the disclosure, each array of sensors includes five to ten sensors that may be arranged in a line, however, those of ordinary skill in the art will appreciate that the quantity and arrangement may be varied to accommodate different architectures and design constraints. In one embodiment, sensor array 121 and sensor array 122 are positioned forward (in terms of physical golf ball flight) of marker 124, and sensor array 123 is positioned behind marker 124 and forward of marker 125. In this embodiment, marker 125 is for putting, and triggering sensor array 123 indicates that a user is putting. In other embodiments, different sensor arrangements may be used, for example, a pressure sensor under marker 125, instead of or in addition to sensor array 123.

In another embodiment, control logic associated with the sensor arrays may be configured to detect the number of objects passing over the sensors to determine whether a full swing or a putting swing is being taken. For example, if one object passes over the arrays (the golf ball) then the control logic determines there was a putting swing. If two objects pass over the sensor arrays (a golf ball followed by a club head) then the control logic determines there was a full swing.

FIG. 4 illustrates a side view of the hitting mat 120 according to an embodiment of the disclosure. In various embodiments of the disclosure the sensor arrays 121, 122 and 123 are comprised of photodetectors. The sensor arrays 121, 122 and 123 are removably positioned in the hitting mat 120 such that light-sensitive surfaces of the photodetectors are substantially flush with or recessed just below the top surface of the hitting mat 120.

The sensor arrays 121, 122 and 123 are operably coupled to the contents of a control box 126 that has control circuitry for the sensor arrays 121, 122, 123. In one embodiment, the control box 126 is positioned at or near a bottom surface and toward a front of the hitting mat 120 enclosure to protect the contents from being disturbed by users stepping on the hitting mat 120. The control box 126 may include one or more access panels, and by way of non-limiting example, the material of the control box 126 may be metal, wood, plastic, and combinations thereof.

Figure 5:
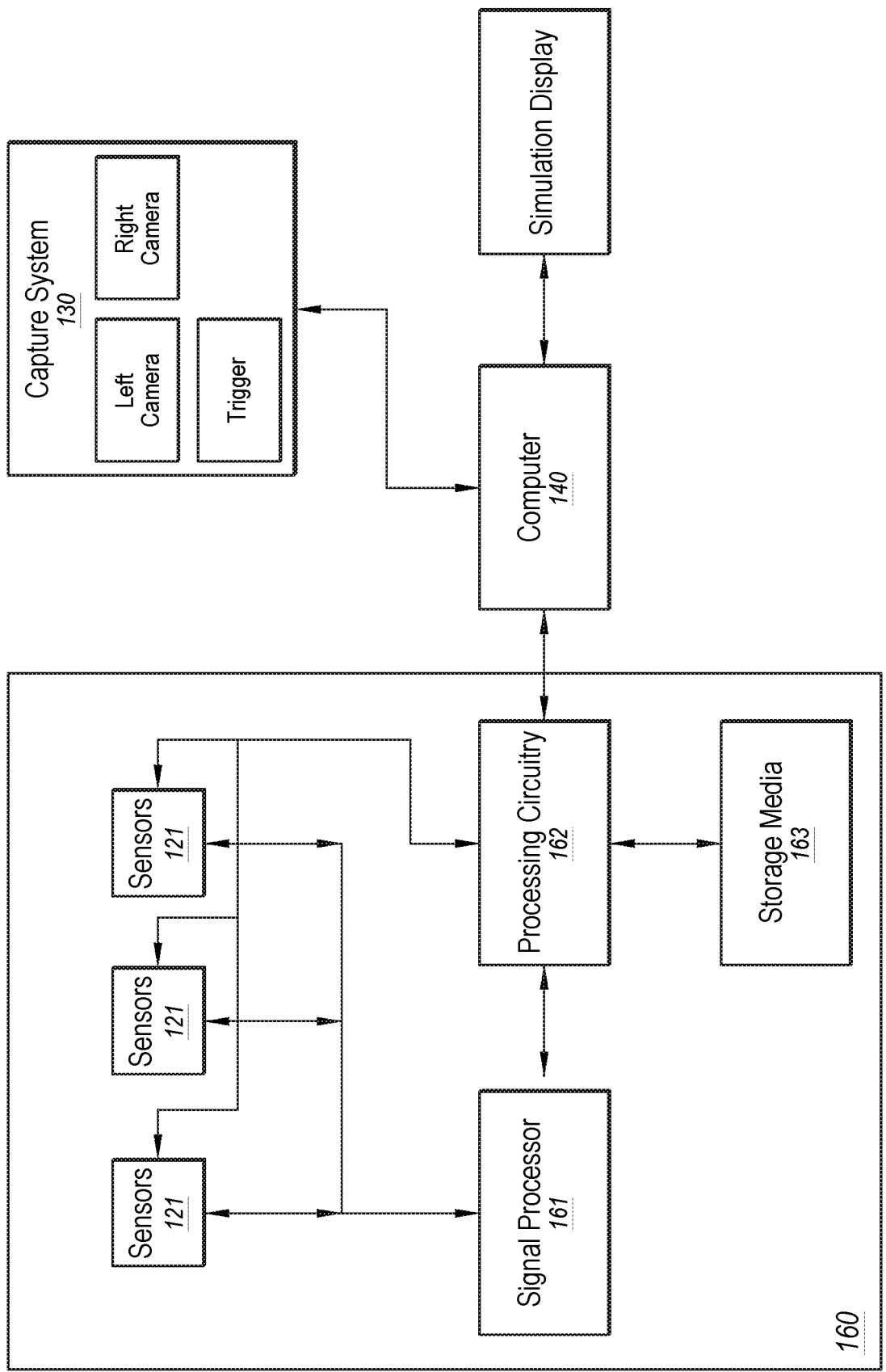
FIG. 5 is a block diagram of a sensing system embedded in the mat of FIG. 3 and FIG. 4, operably coupled to an image capture system and a computer, in accordance with an embodiment of the disclosure.

The control box 126 may include circuitry for controlling a sensor array, such as sensor arrays 121, 122 and 123 (see FIG. 4). FIG. 5 illustrates a sensor system 160 according to an embodiment of the disclosure. The sensor system 160 may include the sensor arrays 121, 122 and 123, a signal processor 161, processing circuitry 162 and storage media 163. The signal processor 161 may receive electrical signals from the sensor arrays 121, 122 and 123 and may be configured to convert the signals into signals for the processing circuitry 162. In one embodiment, the signal processor 161 may include a digital signal processor and may further be configured to perform analog-to-digital conversion. The signal processor 161 may include a comparator to detect changes in the voltage of each sensor, and if the voltage exceeds a threshold, convert the change into a digital signal (e.g., logic voltages 0 to 0.8 volts for a logical "0" and 2 to 5 volts for a logical "1").

The processing circuitry 162 may be configured to receive processed signals from the signal processor 161. In various embodiments, the processing circuitry 162 may be a microcontroller (MCU), and in other embodiments it may be a field-programmable-gate array. The processing circuitry 162 may also be operably coupled to the sensor arrays 121, 122 and 123, and may be configured to provide control signals, to, for example, control the sample rate of the sensor arrays. In various embodiments the sample rate will provide micro-inch or smaller resolution (i.e., frame size). The sample rate of the sensors may be based on a clock oscillator of an MCU and operate in the kilohertz range. In some embodiments, each sensor array 121, 122 and 123 may have a coded sample rate achieved by dividing the clock rate of the MCU. If the sample rate is high, the sensor arrays 121, 122 and 123 may provide high-resolution data to the processing circuitry 162.

In various embodiments of the disclosure, the processing circuitry 162 may be configured to determine timing and position information about a physical golf ball that is struck on the hitting mat 120 based on the signals from the sensor arrays 121, 122, 123. The processing circuitry 162 may be further configured to determine additional information about the golf ball based on the timing and positional information. By way of non-limiting example, the processing circuitry 162 may be configured to calculate one or more values about the physical golf ball including, without limitation, one or more of ball launch speed, launch angle, elements of ball trajectory (one or more of the x-, y-, and z-components of ball trajectory), ball spin, club head speed, and club head face angle.

As illustrated in FIG. 5, the sensor system 160 may be operably coupled to the computer 140, and configured to provide calculated values about the physical golf ball to the computer 140.

As illustrated in FIG. 5, the computer 140 may be operably coupled to the sensor system 160 and the image capture system 130. In various embodiments of the disclosure, the computer 140 is configured to perform operations for image filtering, calculations, and simulation. Image filtering may include filtering the image data received from the image capture system 130 to eliminate and/or deemphasize image artifacts or features that are irrelevant to simulation. Calculations may include calculating one or more of a launch angle, a ball trajectory, a ball speed, a flight distance, ball spin, etc., associated with the physical golf ball (for example, using Equations 1, 2, and 3 described herein). Simulations include generating a virtual golf ball on a virtual golf course such that the flight path and behavior of the virtual golf ball simulates the expected flight path and behavior of the physical golf ball on the physical golf course, and controlling display of the virtual golf ball on the virtual golf course.

Figure 6A:
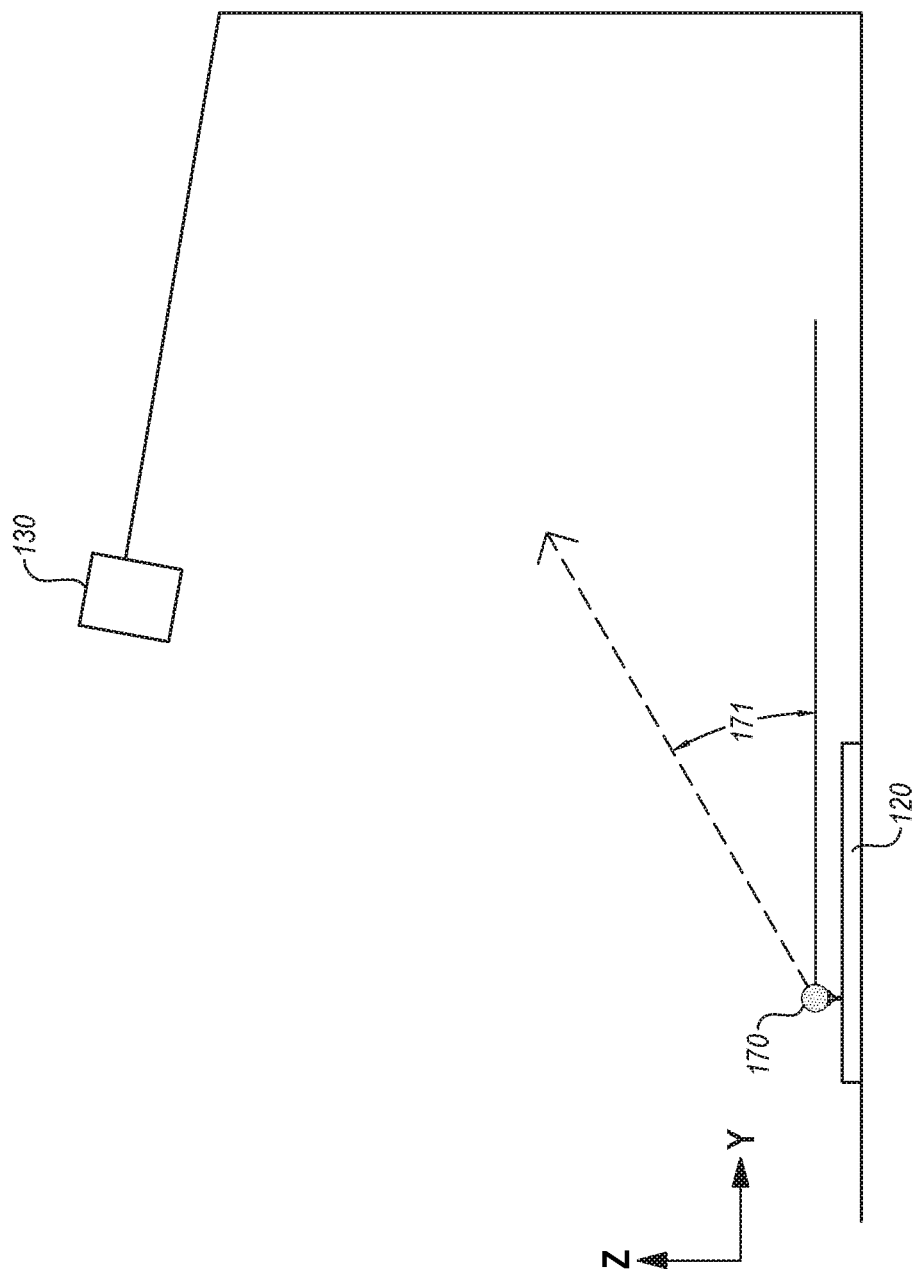
FIGS. 6A and 6B illustrate the flight path of a golf ball struck in the golf simulator of FIG. 1, in accordance with an embodiment of the disclosure.
Figure 6B:
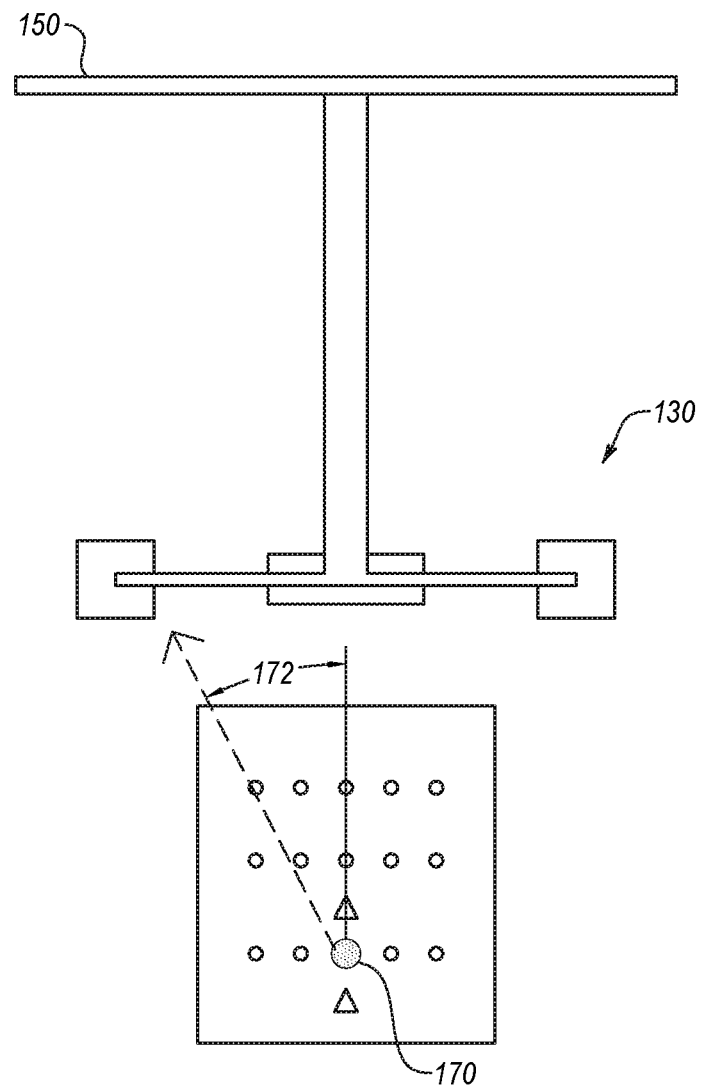
Figure 7A:
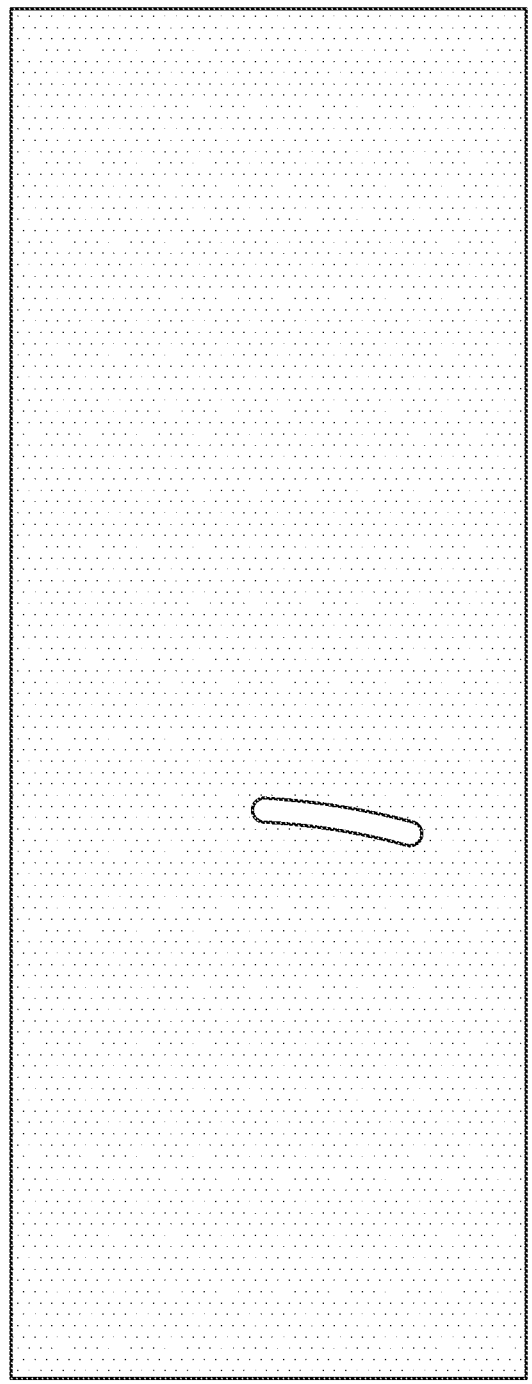
FIGS. 7A and 7B illustrate images captured by cameras in the image capture system of FIG. 5, in accordance with an embodiment of the disclosure.
Figure 7B:
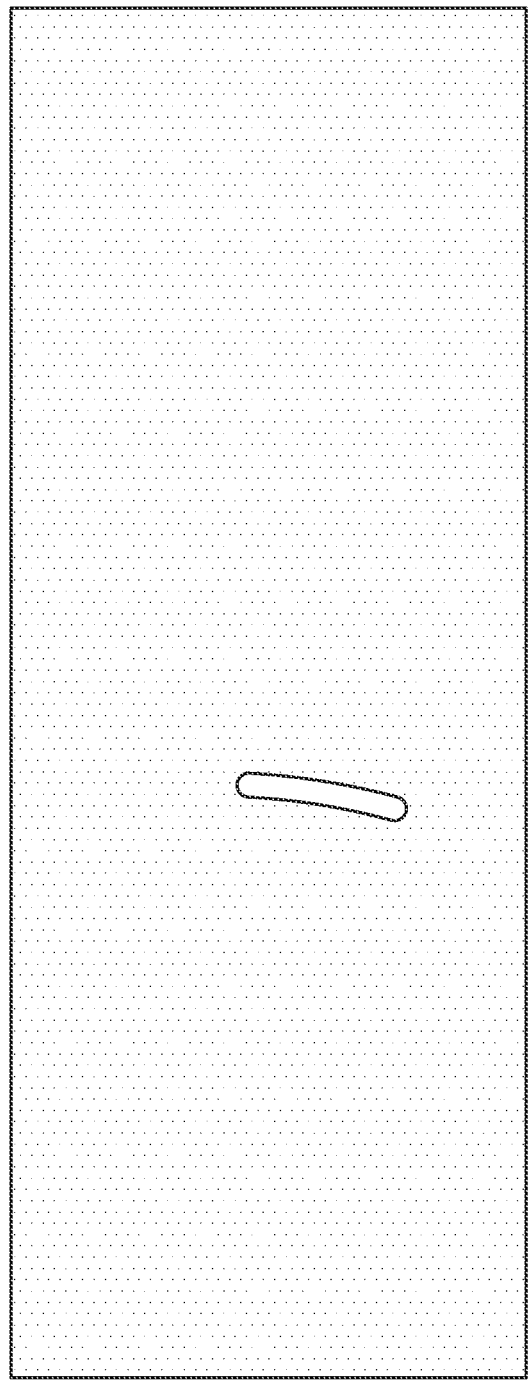

An operation of a golf simulator system 100 in accordance with an embodiment of the disclosure will now be described with reference to FIGS. 6A, 6B, 7A, 7B, 8 and 9. As illustrated in FIGS. 6A and 6B, the physical golf ball 170 is struck and its flight path includes a launch angle 171 in the Z-Y plane and ball angle 172 in the X-Y plane. Though not shown, the golf ball 170 also has a launch speed and a ball spin. FIGS. 6A and 6B also illustrate the image capture system 130, hitting mat 120 and display 150.

Figure 8:
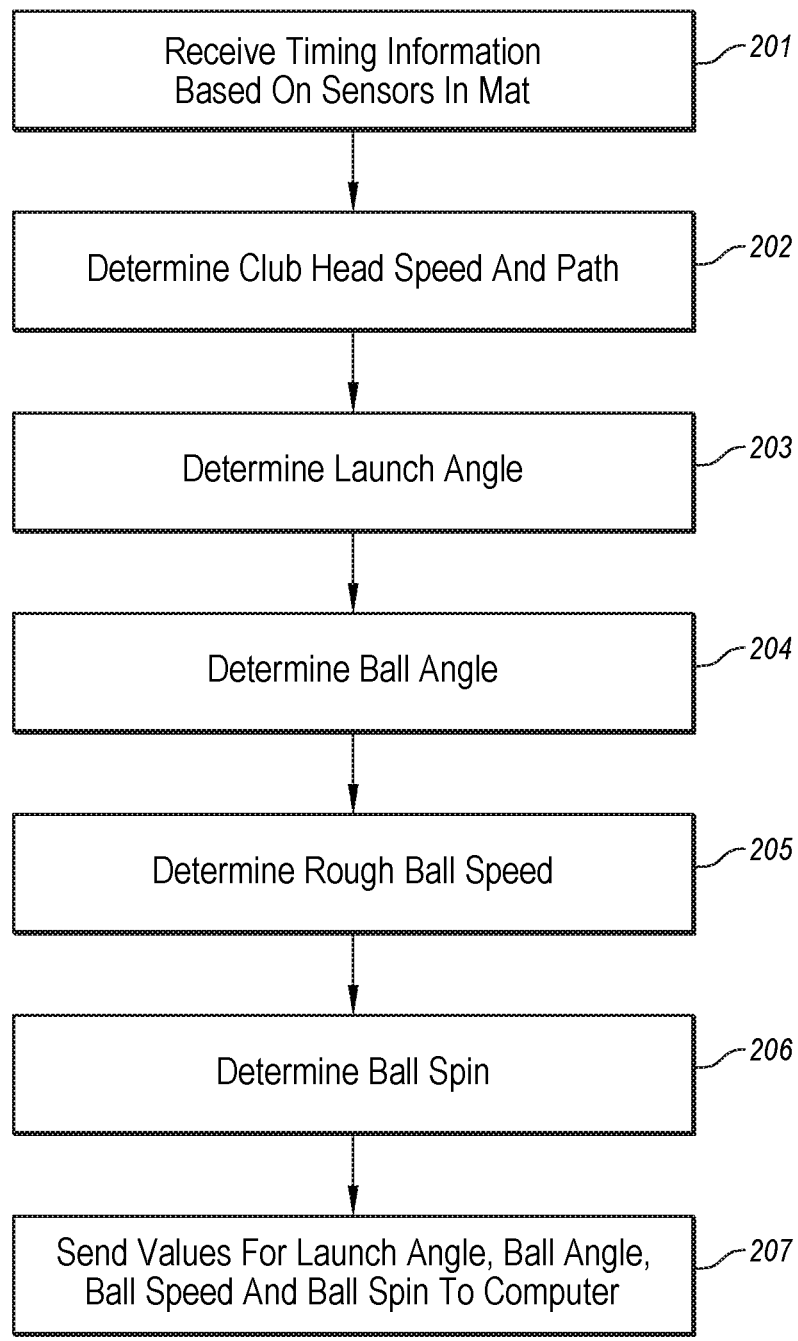
FIG. 8 illustrates an operation of a sensor system, in accordance with an embodiment of the disclosure.

As illustrated in FIG. 8, the sensor system 160 of the hitting mat 120 is triggered by the flight path of the golf ball 170 and gathers timing data from the path of the golf ball 170 across the sensor arrays 122 and 123 (operation 201), and the processing circuitry 162 calculates club head speed and path (operation 202), initial values for the launch angle 171 (operation 203), ball angle 172 (operation 204), ball speed (operation 205), and ball spin (operation 206) from the timing data. Those initial values are provided to the computer 140 (operation 207).

Figure 9:
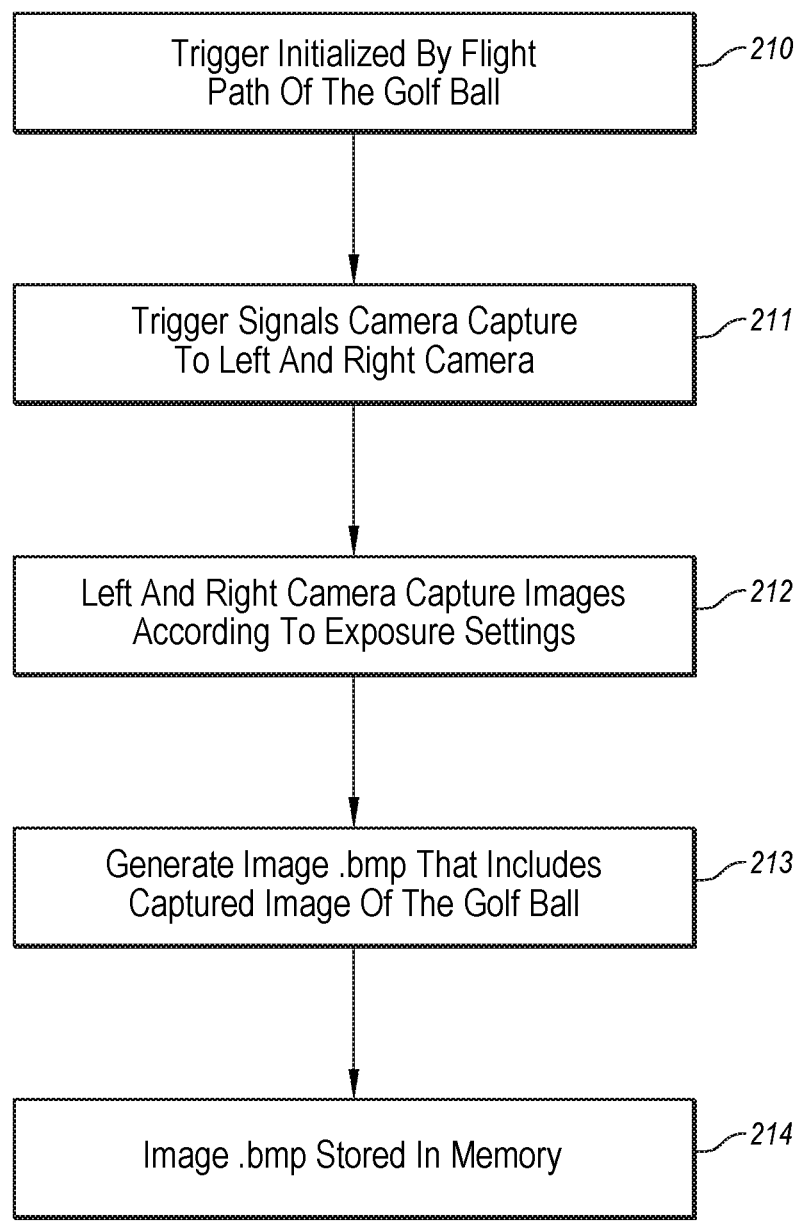
FIG. 9 illustrates an operation of an image capture system, in accordance with an embodiment of the disclosure.

As illustrated in FIG. 9, the trigger 133 is initialized by the flight path of the ball (operation 210) and the trigger 133 signals the left camera 131 and right camera 132 for image capture (operation 211), and the cameras 131 and 132 capture images according to their exposure settings (operations 212). The captured images are .bmp images (operation 213), examples of which may be seen in images 173 and 174 of FIGS. 7A and 7B. Images 173 and 174 are images of the ball path captured by the left camera 131 and the right camera 132, respectively (operation 211). The exposure setting(s) used to capture the image affect the elongated shape of the golf ball 170 along its flight path in each of the generated .bmp images 173 and 174. The .bmp images 173 and 174 are stored in memory (operation 214), and are available to the computer 140 (operation 214).

Figure 10:
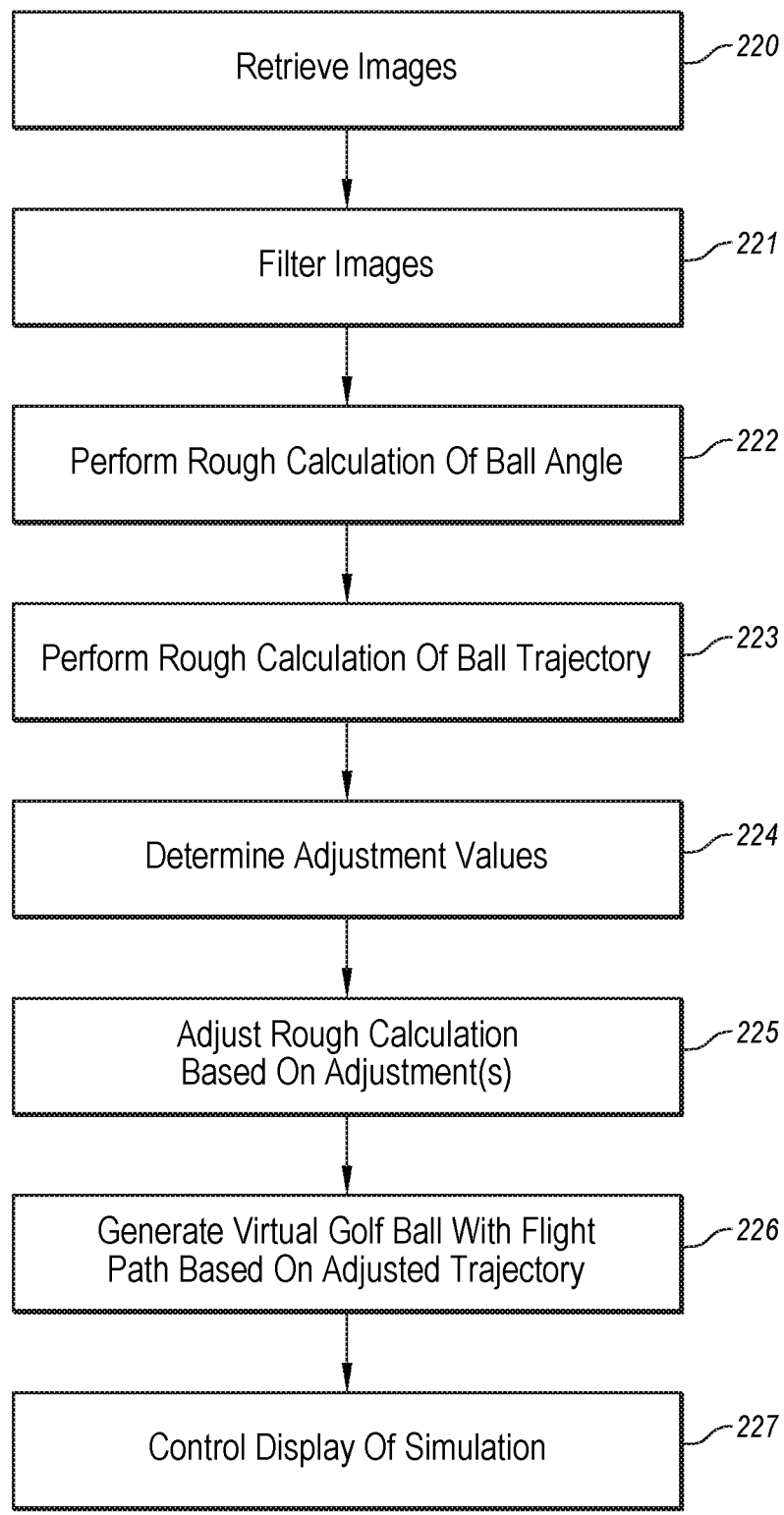
FIG. 10 illustrates an operation of a computer for simulating golf ball flight, in accordance with an embodiment of the disclosure.

FIG. 10 illustrates an operation of the computer 140 according to an embodiment of the disclosure. The computer 140 retrieves the images 173 and 174 (FIGS. 7A and 7B) from the image capture system 130 (operation 220). In one embodiment, the computer 140 is configured to determine an appropriate window of time to retrieve the stereographic images from the image capture system 130 based on the rough ball speed received from the processing circuitry 162. If the computer 140 retrieves images too early, the images stored in the memory of the image capture system 130 may be old or otherwise irrelevant (e.g., taken erroneously because someone walked across the playing surface).

The computer 140 filters the .bmp images 173 and 174 to eliminate irrelevant features in the .bmp images other than those corresponding to the golf ball 170 (operation 221). For example, if another golf ball or trash is on the playing surface 110 and in the field of view of either left camera 131 or right camera 132 and is captured, those extraneous items are deemphasized or eliminated from images.

Next, the computer 140 determines positional information from the images 173 and 174 and performs a calculation (operation 222) to determine a rough value for the launch angle of the ball. One advantage of performing the rough calculation of ball angle early is that it optimizes use of the CPU of the computer 140.

Next, the computer 140 determines positional information from the images 173 and 174 and performs a calculation (operation 223) to determine a rough value for the flight trajectory of the ball. In one embodiment, the rough approximation is based on a single linear expression and known values corresponding to assumptions of where the golf ball is likely to be, which simplifies the math for solving the three unknowns (i.e., x, y, z). In some embodiments that computer 140 uses the launch angle, ball speed, ball spin, and combinations thereof, in addition to the positional information gleaned from the image 173 and 174 to determine the rough calculation.

Figure 11A:
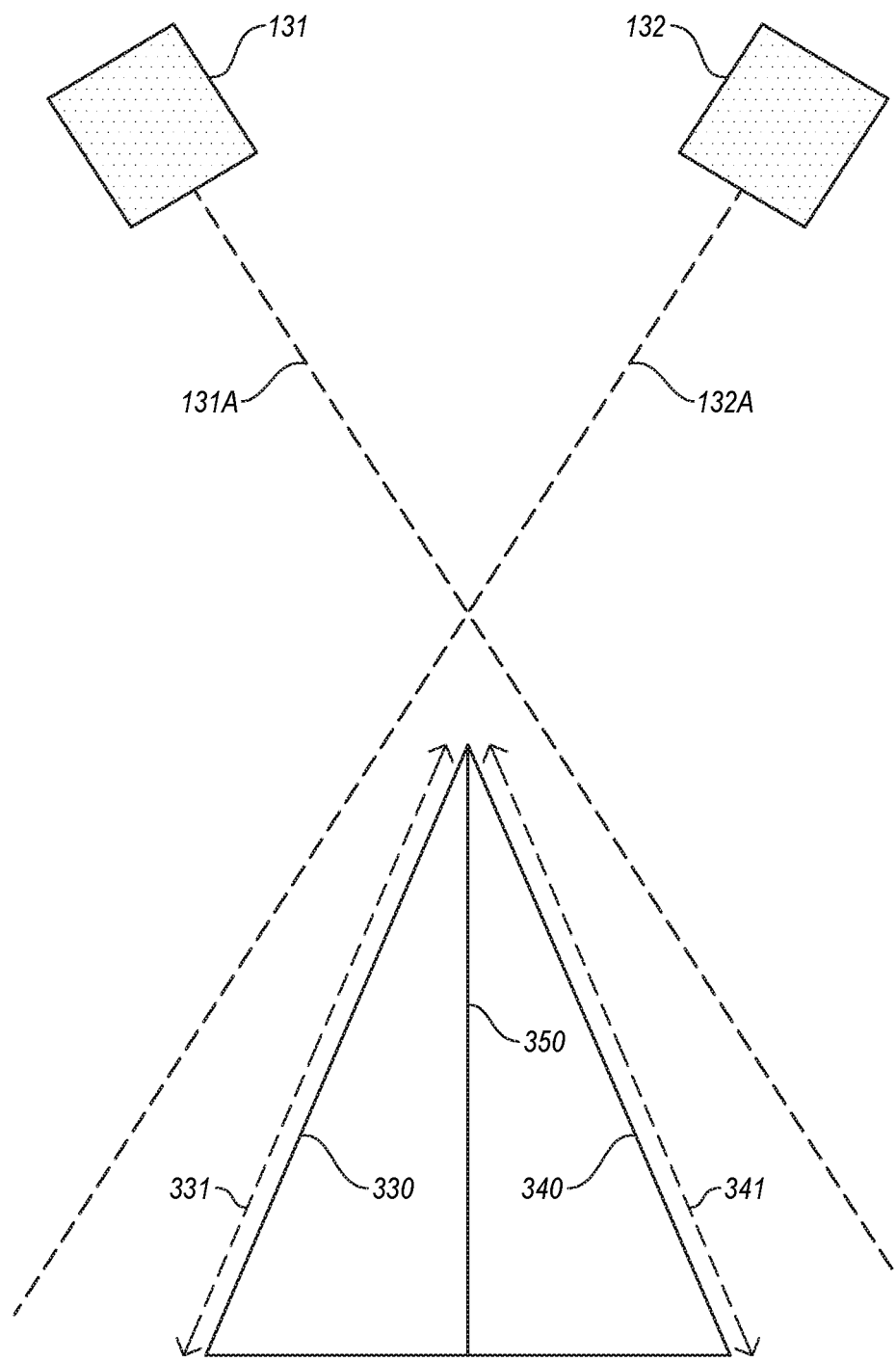
FIGS. 11A and 11B illustrate calculation of ball trajectory, in accordance with an embodiment of the disclosure.
Figure 11B:
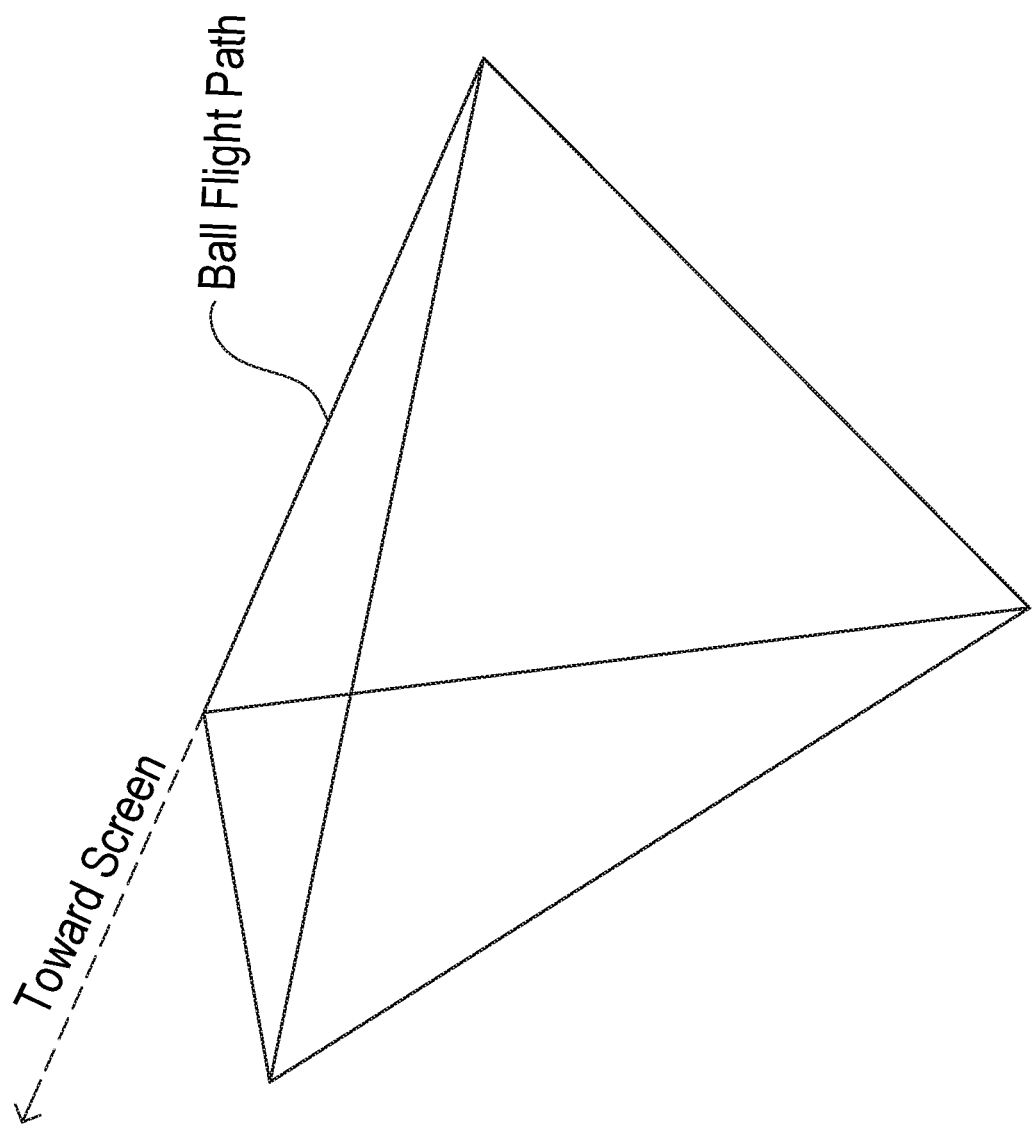

Next, adjustment values are generated for the x, y and z values (operation 224). In one embodiment, the adjustment values are determined based on the orthogonality of the golf ball's trajectory to the capture plane of the left camera 131 and the right camera 132. For example, the length of the image of the golf ball 170 in image 173 and image 174 depends on the orthogonality of the ball's trajectory to the capture plane of the camera. FIGS. 11A and 11B illustrate the geometry of this approach. Cameras 131 and 132 have views of capture fields 131A and 132B, respectively. The streak in the image capture from each camera 131 and 132 is represented as a line 330 and line 340. The line 330 has a length 331 and the line 340 has a length 341. In various embodiments of the disclosure the lengths 331 and 341 may be determined by counting pixels. Given a consistent exposure time, the length 331 and 341 will vary based on the trajectory of the ball. Such information along with information about the view field of each camera can be used to determine the trajectory 350 of the golf ball.

If the flight path of the golf ball 170 is directly at either camera, then it will appear as a circle in an image captured by that camera. If the flight path of the golf ball 170 is not biased toward one camera or the other, then the length of the golf ball images should be substantially identical. Variations can be determined based on the lengths 331 and 341 and whether the flight path of the golf ball 170 is biased toward capture field 131A or the capture field 132A. FIG. 11B illustrates a three-dimensional view of the concept illustrated in FIG. 11A.

Turning back to FIG. 10, the adjustment(s) may be applied to the rough calculations for the x, y, and z values of the trajectory of the golf ball 170 (operation 225) to determine an adjusted trajectory. In some embodiments, the adjusted trajectory may be compared to tolerance thresholds and iteratively adjusted until it is within a tolerance threshold.

One of ordinary skill in the art will recognize numerous advantages of the embodiments of the disclosure described herein. One such advantage will be a short simulation delay, by way of non-limiting example, of about 1 second or less. The advantage achievable, in part, because embodiments of the disclosure are not subject to the inherent limitations of a general-purpose computer solving for three variables using three simultaneously true equations. Various embodiments of the disclosure may utilize information known about the image(s) and the cameras and trigonometric functions to determine the ball speed and ball trajectory. Such information can also be used to correct rough calculations. This facilitates a much quick solution and shortens the time from when a user strikes a physical golf ball and when that simulated golf ball appears on a display.

In one embodiment, the computer 140 is configured to compare where the golf ball is expected to be based on initial determinations of launch angle, ball angle and ball speed, compared to where it is actually captured to determine variations and recalculate the launch angle, ball angle and ball speed to determine a trajectory of the golf ball.

The computer 140 may generate data for the simulated flight path of a simulated golf ball based on the adjusted trajectory of the golf ball 170 (operation 226). The data may be provided to a 3D graphics engine (such as TruGolf, Inc.'s e6Golf engine) and the computer 140 may further control display of a simulated golf ball and its flight path on a simulated golf course on display 150 (operation 227). The computer 140 may also control display of reporting information relevant to the player on the display 150 or on another display, for example, a computer or tablet screen.

Figure 12:
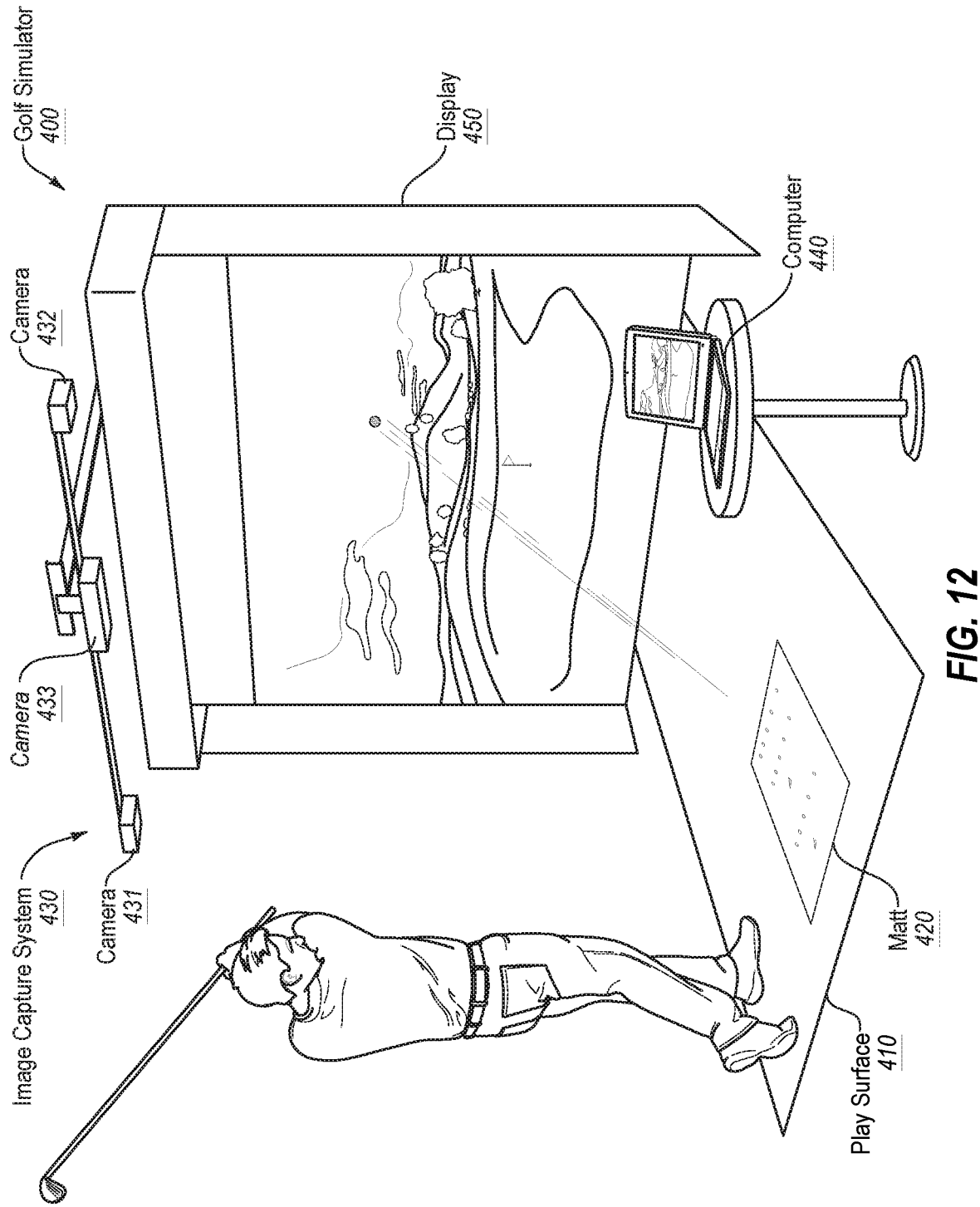
FIG. 12 is an isometric view of a golf simulator, in accordance with an embodiment of the disclosure.
Figure 13:
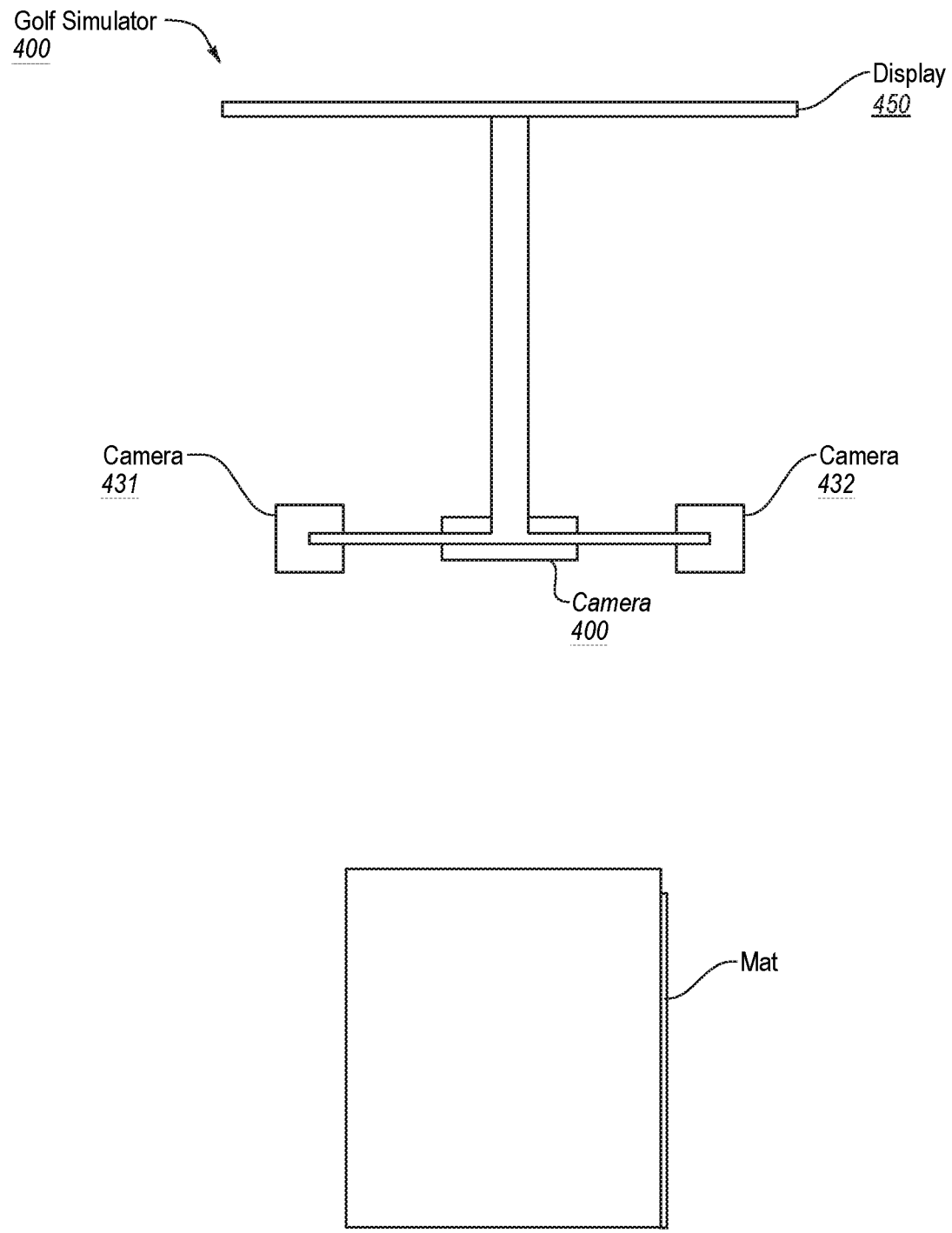
FIG. 13 is a top-down view of the golf simulator of FIG. 12, in accordance with an embodiment of the disclosure.

FIGS. 12 and 13 show a golf simulator system 400 from an isometric and top-down perspective, respectively, in accordance with and embodiment of the disclosure. The golf simulator system 400 includes a playing surface 410, a hitting mat 420, an image capture system 430, a computer 440, and a display 450. The golf simulator system 400 may optionally include an enclosure, but none is shown. The playing surface 410 and display 450 may be similar to the display and playing surface of golf simulator system 100, shown in FIG. 1.

The display 450 may be operably coupled to, and communicate with, the computer 440. In one embodiment, the display 450 may comprise a screen and a projector, and the images generated by the computer 440 may be provided to the projector for presentation onto the screen. In other embodiments, the display 450 may be an LCD, plasma, or rear-project.

The image capture system 430 may include a left camera 431, a right camera 432, and an overhead camera 433. The image capture system 430 may be positioned by a support structure over the playing surface 410 so that a field of view captured by the cameras 431, 432, and 433 includes the playing surface 410, hitting mat 420, and at least part of the likely flight path of a physical golf ball. The left camera 431, the right camera 432 and the overhead camera 433 may be arranged in a stereoscopic manner. The overhead camera 433 may be positioned so that the field of view of the overhead camera 433 will include a physical golf ball from tee, a club swing path prior to hitting the golf ball, and a likely flight path of the physical golf ball after being hit by a swung club. In various embodiments of the disclosure the cameras 431, 432, and 433 are digital cameras, preferably selected to have consistent, repeatable exposure periods.

The image capture system 430 may be operably coupled to the computer 440. Control signals for the image capture system 430, and more particularly the left camera 431, right camera 432, and overhead camera 433 may be generated by the computer 440 and communicated to the image capture system 430. The control signals may be related to any number of features and functions of the image capture system 430. In various embodiments of the disclosure, control signals are provided during a set-up process and are indicative of an exposure time of the left camera 431, right camera 432, and overhead camera 433. In one embodiment, the control signals may include a shutter speed that would affect the exposure time of the cameras.

Upon receiving a signal from the computer 440, the cameras 431 and 432 may be configured to capture images. Each camera 431, 432, and 433 may include a memory configured to store captured images. In another embodiment, the cameras 431, 432, and 433 may share a memory with allocated memory addresses for each camera configured to store captured images. The computer 440 may be coupled to a camera's memory and configured to retrieve stored image(s). In various embodiments of the disclosure, each time new images and stored in a memory, the new images may overwrite any old images.

The computer 440 may be configured to provide a control signal to the cameras 431 and 432 to capture images responsive to a club swing condition being detected responsive to images captured by the overhead camera 433. While the golf simulator system 400 is operating, the overhead camera 433 may be configured to capture images that are processed by the computer 440 to detect a club swing condition. Notably, separate sensors in a hitting mat are not necessary to detect the club head and trigger the left and right cameras 431 and 432.

As mentioned above, the image capture system 430 may be coupled to, and communicate with, the computer 440. Image capture data captured by the image capture system 430 may be transmitted to the computer 440. The image capture data may be streamed in real time or transferred after it is captured. In one embodiment, the computer may read image capture data direct from a camera to a memory for processing. In one embodiment, the image capture data may be formatted and stored (e.g., for later use), and the format of the stored image capture data may be one of MPEG, AVI, WMV, or some other video format. In another embodiment the format of the stored image capture data may be one of BITMAP, JPEG, TIFF, PNG, GIF, or in some other image format.

In one embodiment, the computer 440 may be configured to determine a launch angle of a golf ball as described, above, with reference to FIGS. 7A, 7B, 8, 9, 10, 11A and 11B.

Figure 14:
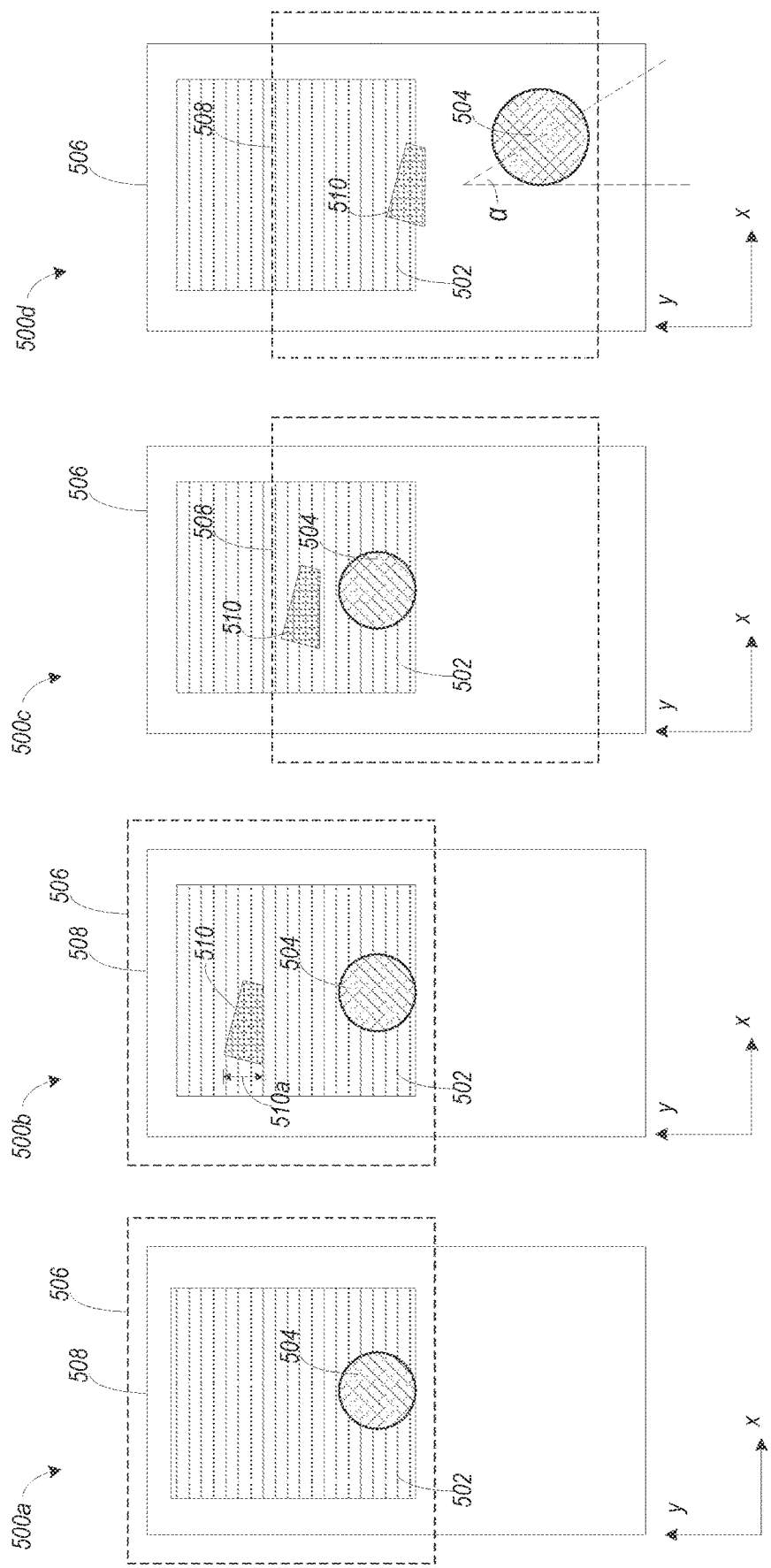
FIGS. 14A to 14D show images captured by an image capture system of a golf simulator of FIG. 12, in accordance with an embodiment of the disclosure.

FIGS. 14A, 14B, 14C, and 14D show image processing of images captured by the overhead camera 433, in accordance with embodiments of the disclosure. FIG. 14A shows an image 500a captured by the overhead camera 433. The image 500a includes a field of view 508, a mat 502, and a golf ball 504. A window 506 corresponds to a part of the field of view 508 that the computer 440 is configured to process while in a standby state (e.g., waiting for a club swing condition).

FIG. 14B shows an image 500b captured by the overhead camera 433 after the image 500a. The image 500b includes a club head 510 in the window 506. The computer 440 may be configured to detect a club swing condition responsive to detecting the club head 510. The computer 440 may be configured to change from a standby state to a ball flight detection state responsive to detecting the club swing condition. The computer 440 may be configured to determine a position of the club head 510 and/or golf ball 504 based on the image 500b. In one embodiment, position determinations may be x and y Cartesian coordinate's relative to the field of view 508. In one embodiment, the x and y Cartesian coordinates may be determined based on a pixel count. In one embodiment, the computer 440 may be configured to detect a type of the club head 510 responsive to a determination of a club-head width 510a of the club head 510. In one embodiment, the club-head width 510a may be determined by counting pixels in the y direction.

FIG. 14C shows an image 500c captured by the overhead camera 433 after the image 500b. Notably, the window 506 corresponds to a different part of the field of view 508 than in images 500a and 500b. In one embodiment, the computer 440 may be configured to change the window 506 to correspond to a different part of the field of view 508 responsive to detecting the club head 510. The computer 440 may be configured to determine a position of the club head 510 and/or golf ball 504 based on the image 500c. In image 500c, the position of the club head 510 is closer to the position of the golf ball 504 than in image 500b. The computer 440 may be configured to determine a club hit path and club hit speed based on a position of the club head 510 in an image 500b, a position of the club head 510 in an image 500c, and timing information. In one embodiment, timing information may be determined using the shutter speed and frame no. of the images 500b and 500c.

FIG. 14D shows an image 500d captured by the overhead camera 433 after the image 500c. The computer 440 may be configured to determine a position of the club head 510 and/or golf ball 504 based on the image 500d. Notably, a position of the golf ball 504 and a position of the club head 510 are different than in 500c. The computer 440 may be configured to determine a club hit path and club hit speed based on a position of the club head 510 in image 500c, a position of the club head 510 in an image 500d, and timing information. Optionally, the computer 440 may be configured to determine club hit path and club hit speed based on previous determinations with respect to images 500b and 500c.

The computer 440 may be configured to determine ball angle, ball spin, and ball speed based on a position of the golf ball 504 in image 500c, a position of the golf ball 504 in image 500d, and timing information. In one embodiment, the computer 440 may be configured to determine ball angle and ball speed based on Equations x-y, below:

$$\text{ball spin} = \text{ball back spin} \times \text{ball side spin} \quad \text{(Eq. 1)}$$

$$\text{ball side spin} = \text{club path} \times \text{ball side angle} \quad \text{(Eq. 2)}$$

$$\text{ball back spin} = \text{loft angle} \times \text{ball speed} \quad \text{(Eq. 3)}$$

In one embodiment, the loft angle may be a stored parameter associated with a type of the club head 510 at the computer 440. In one embodiment, ball angle α (shown in FIG. 14D) may be determined using a position of the golf ball 504 in image 500c, a position of the golf ball 504 in image 500d, and trigonometry. One of ordinary skill in the art would understand that one or more modifiers may be used in conjunction with Equations 1, 2 and 3, to account for parameters that may affect aspects of the characteristic being determined.

In various embodiments, the computer 440 may be configured to store information with images 500a-500c, for example, frame #, frame count, time (e.g., milliseconds), camera speed (for each camera), exposure time (for each camera), waggle, club width, ball speed, ball angle, club path, ball path, ball side spin, ball back spin, loft angle, ball size, and optional modifiers for any one of the foregoing. Further, information about the field of view 508 and window 506 may be stored for each image 500a-500d, for example, height, width, resolution, etc.

One of ordinary skill in the art would understand that the window 506 may be configured differently than as shown in FIGS. 14A-14D, including, for example, to correspond to the entire field of view 508 for one or more of the images 500a-500d.

The computer 440 may be configured to determine a ball trajectory based on a ball angle, a launch angle, ball speed and ball spin; and further configured to determine a simulated flight bath of a virtual golf ball responsive to the determined trajectory.

Figure 15:
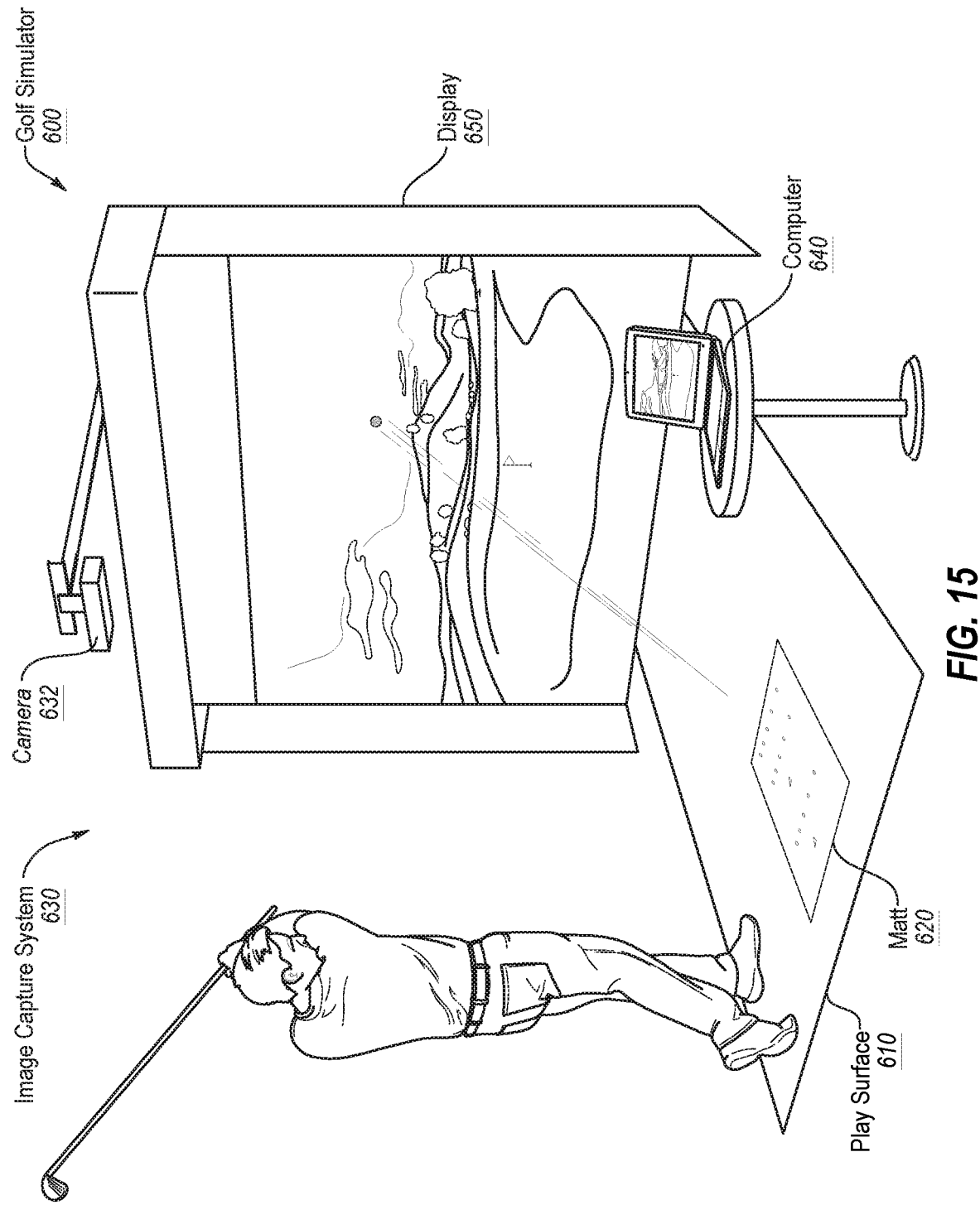
FIG. 15 is an isometric view of a golf simulator, in accordance with an embodiment of the disclosure.

FIGS. 15 and 16 show a golf simulator system 600 from an isometric and top-down perspective, respectively, in accordance with and embodiment of the disclosure. The golf simulator system 600 includes a playing surface 610, a hitting mat 620, an image capture system 630, a computer 640, and a display 650. The golf simulator system 600 may optionally include an enclosure, but none is shown. The playing surface 610 and display 650 may be similar to the display and playing surface of golf simulator system 100, shown in FIG. 1.

The display 650 may be operably coupled to, and communicate with, the computer 640. In one embodiment, the display 650 may comprise a screen and a projector, and the images generated by the computer 640 may be provided to the projector for presentation onto the screen. In other embodiments, the display 650 may be an LCD, plasma, or rear-project.

The image capture system 630 may include a single, overhead camera 632. The image capture system 630 may be positioned by a support structure over the playing surface 610 so that a field of view captured by the overhead camera 632 includes the playing surface 610, hitting mat 620, at least part of a club swing path prior to hitting the golf ball, and at least part of the likely flight path of a physical golf ball. In various embodiments of the disclosure the overhead camera 632 is a digital camera, preferably selected to have consistent, repeatable exposure periods.

The image capture system 630 may be operably coupled to the computer 640. Control signals for the image capture system 630, and more particularly the overhead camera 632 may be generated by the computer 640 and communicated to the image capture system 630. The control signals may be related to any number of features and functions of the image capture system 630. In various embodiments of the disclosure, control signals are provided during a set-up process and are indicative of an exposure time of the overhead camera 632. In one embodiment, the control signals may include a shutter speed that would affect the exposure time of the cameras.

Upon receiving a signal from the computer 640, the overhead camera 632 may be configured to capture images. The overhead camera 632 may include a memory configured to store captured images. In another embodiment, the overhead camera 632 may access a shared memory with allocated memory addresses for the overhead camera 632 to store captured images. The computer 640 may be coupled to a camera's memory and configured to retrieve stored image(s). In various embodiments of the disclosure, each time new images and stored in a memory, the new images may overwrite any old images.

The computer 640 may be configured to provide a control signal to the overhead camera 632 to capture images responsive to a club swing condition being detected responsive to images captured by the overhead camera 632. While the golf simulator system 600 is operating, the overhead camera 632 may be configured to capture images that are processed by the computer 640 to detect a club swing condition.

As mentioned above, the image capture system 630 may be coupled to, and communicate with, the computer 640. Image capture data captured by the image capture system 630 may be transmitted to the computer 640. The image capture data may be streamed in real time or transferred after it is captured. In one embodiment, the computer may read image capture data direct from a camera to a memory for processing. In one embodiment, the image capture data may be formatted and stored (e.g., for later use), and the format of the stored image capture data may be one of MPEG, AVI, WMV, or MOV, or some other video format. In another embodiment the format of the stored image capture data may be one of BITMAP, JPEG, TIFF, PNG, GIF, or in some other image format.

The computer 640 may be configured to determine club hit speed, ball angle, ball spin, and ball speed from one or more images, substantially in the manner described with reference to the computer 440 and FIGS. 14A to 14D.

Figure 17B:
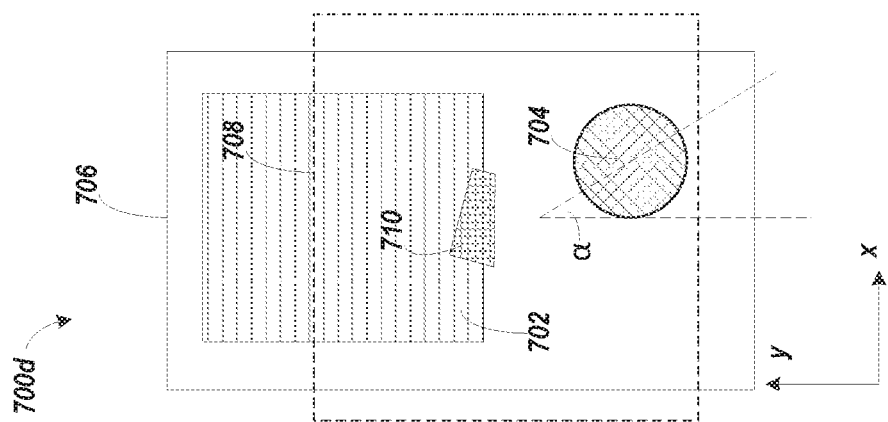
FIGS. 17A and 17B show images captured by an image capture system of a golf simulator of FIG. 15, in accordance with an embodiment of the disclosure.
Figure 17A:
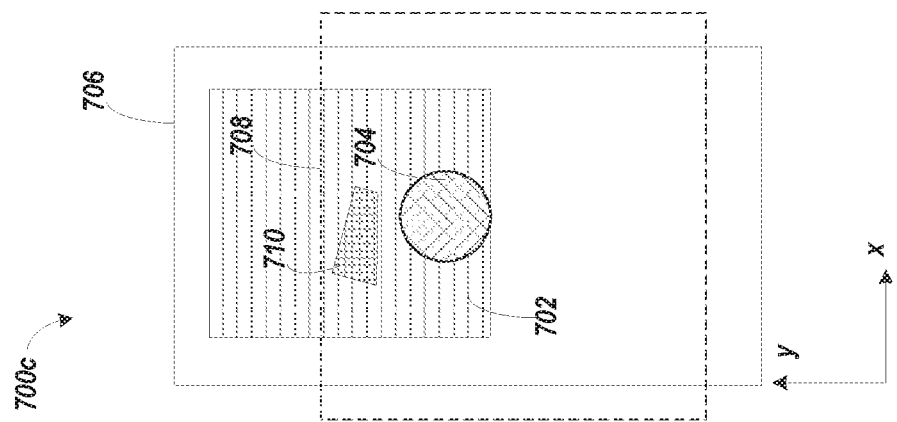

The computer 640 may be configured to determine ball launch angle based on a change in ball diameter for successive images. FIGS. 17A and 17B show images 700c and 700d captured by image capture system 630, in accordance with embodiments of the disclosure. Notably, the golf ball 704 has a larger diameter in image 700d than 700c, which is indicative of a physical golf ball moving closer to the overhead camera 632 from the capture of image 700c to the capture of image 700d. The computer 640 may be configured to determine a launch angle based on the change in diameter and timing information associated with images 700c and 700d.

Using images received from one image capture device, the computer 640 may be configured to determine a ball trajectory based on a ball angle, a launch angle, ball speed and ball spin; and further configured to determine a simulated flight bath of a virtual golf ball responsive to the determined trajectory. One of ordinary skill in the art will understand that using one image capture device simplifies the golf simulator, including simplifying setup and connections between the image capture device, the computer, and the display.

In one embodiment, a side view camera (not shown) may be incorporated into any of the image capture systems described herein. The images captured by a side view camera may be processed by a computer to, for example, determine one or more of a launch angle, ball angle, ball speed, club head speed, etc.

While various embodiments of the disclosure are described with reference to images captured by cameras, one of ordinary skill in the art would understand that the embodiments may be practiced using other forms of image capture, including video cameras. For example, it is specifically contemplated that video frames may be processed in the manner described herein.

Various embodiments of the computer (e.g., computer 140, 440 and 640), signal processor 161, and processing circuitry 162 may be implemented as one or more of a processor, a controller, a plurality of processors and/or other structure configured to execute executable instructions including, for example, software and/or firmware instructions, and/or hardware circuitry. The executable instructions may be stored on computer-readable storage media. Various embodiments of the computer (e.g., computer 140, 440 and 640), signal processor 161, and processing circuitry 162 may include a general-purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor but, in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration. These examples are for illustration and other suitable configurations within the scope of the invention are also contemplated.

One of ordinary skill in the art will understand that while aspects of embodiments herein have been described in terms Cartesian coordinates, position and vectors may be expressed in other coordinate systems, including polar coordinates, and one of ordinary skill in the art may use one or many coordinate systems (or operate in one or more domains other than the spatial domain) and may transform data between coordinate systems.

One of ordinary skill in the art will appreciate that "media," "medium," "storage media," "computer-readable media," or "computer-readable medium," as used herein, may include a diskette, a magnetic tape, a digital tape, a compact disc, an integrated circuit, a ROM, a CD, DVD, BLU-RAY®, a cartridge, Flash memory, PROM, a RAM, a memory stick or card, or any other non-destructive storage medium useable by computers, including those that are re-writable.

Although the operations illustrated or described herein and accompanying text recites acts performed in a particular order, the embodiments of the present disclosure do not necessarily need to operate in that recited order. One of ordinary skill in the art would recognize many variations, including performing acts in parallel, or in a different order.

Elements and components of embodiments may be described herein as in "electrical communication," and may further be illustrated or described herein with lines of the indicated electrical communication. The form of electrical communication may take various forms and may refer to a plurality of signals or conductors, which may be used to transfer one or more various types of information, such as data, addresses, control, or status, such as a cable or a bus. Communication may be implemented in forms including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Suitable communications protocols may include TCP/IP, UDP, or OSI, for example. For wireless communications, communications protocols may include BLUETOOTH®, ZIGBEE®, IrDa or other suitable protocol. Furthermore, components of the system may communicate through a combination of wired or wireless paths.

The features of the various embodiments of the disclosure described herein are not mutually exclusive and can exist in various combinations and permutations, even if such combinations or permutations were not expressly made herein, without departing from the scope of the disclosure. In fact, variations, modifications, and other implementations of what was described herein will occur to those of ordinary skill in the art without departing from the scope of the disclosure. As such, the invention is not to be defined only by the preceding illustrative description, but only by the claims which follow, and legal equivalents thereof.

One of ordinary skill in the art will recognize that the embodiments described herein may be implemented to simulate a flight path of objects other than golf balls, for example, baseballs, tennis balls, arrows, etc.

Additional non-limiting embodiments of the present disclosure, include:

Embodiment 1: A golf simulator, comprising: an image capture device; and a computer, wherein the computer is adapted to generate simulation data of a flight path of a golf ball responsive to a club swing event by: determining a ball angle of the golf ball responsive to images captured by the image capture device; determining a launch angle of the golf ball responsive to images captured by the image capture device; determining a ball spin of the golf ball responsive to images captured by the image capture device; determining a ball speed of the golf ball responsive to images captured by the image capture device; determine a trajectory of the golf ball responsive to the ball angle, the launch angle, the ball spin, and the ball speed; and generating simulation data indicative of a virtual golf ball with a virtual flight path responsive to the trajectory.

Embodiment 2: The golf simulator of Embodiment 1, wherein the computer is adapted to determine a ball angle of the golf ball responsive to the images captured by the image capture device by: identifying a first position of the golf ball at a first time; identifying a second position of the golf ball at a second time; and determining the ball angle of the golf ball responsive to the first position and the second position.

Embodiment 3: The golf simulator of Embodiment 1, wherein the computer is adapted to determine a ball speed of the golf ball responsive to images captured by the image capture device by: identifying a first position of the golf ball at a first time; identifying a second position of the golf ball at a second time; and determining the ball speed of the golf ball responsive to the first position and the second position.

Embodiment 4: The golf simulator of Embodiment 1, wherein the computer is adapted to determine a ball spin of the golf ball responsive to images captured by the image capture device by: determining a club head path; determining a side spin of the golf ball responsive to the club head path and the ball angle; determining a back spin of the golf ball responsive to the ball speed and the launch angle; and determining the ball spin responsive to the side spin and the back spin.

Embodiment 5: The golf simulator of Embodiment 1, wherein the computer is adapted to provide a control signal to the image capture device responsive to detecting a club swing event.

Embodiment 6: The golf simulator of Embodiment 5, wherein the computer is adapted to detect a club swing event responsive to an image provided by the image capture device.

Embodiment 7: The golf simulator of Embodiment 1, wherein the image capture device is an overhead camera.

Embodiment 8: A computer-implemented method of simulating a golf ball flight path, comprising: determining a ball angle of the golf ball responsive to images captured by the image capture device; determining a launch angle of the golf ball responsive to images captured by the image capture device; determining a ball spin of the golf ball responsive to images captured by the image capture device; determining a ball speed of the golf ball responsive to images captured by the image capture device; determine a trajectory of the golf ball responsive to the ball angle, the launch angle, the ball spin, and the ball speed; and generating simulation data indicative of a virtual golf ball with a virtual flight path responsive to the trajectory.

What is claimed is:

1. A golf simulator, comprising:
   an image capture system comprising a first camera and a second camera, wherein the first camera and the second camera are adapted to be positioned in a stereographic arrangement; and
   a computer, wherein the computer is adapted to generate simulation data of a golf ball flight path responsive to a club swing event by:
      determining a first trajectory of the golf ball based on a linear expression;
      determining variations responsive to a flight path of the golf ball according to a first plane and a second plane, the first plane and second plane having orthogonality;
      adjusting the first trajectory responsive to the variations; and
      generating simulation data indicative of a virtual golf ball with a virtual flight path responsive to the adjusted first trajectory.

2. The golf simulator of claim 1, wherein the computer is adapted to determine a club swing event responsive to a first image captured by the first camera and a second image captured by the second camera, wherein the first image and the second image have indicators indicative of the first image and the second image being contemporaneous in time.

3. The golf simulator of claim 2, wherein the computer is adapted to determine a launch angle responsive to the first image and the second image.

4. The golf simulator of claim 3, wherein the computer is adapted to determine the launch angle, ball speed, and ball angle responsive to exposure artifacts in the first image and the second image.

5. The golf simulator of claim 3, further comprising:
   a trigger configured to provide one or more signals to the image capture system responsive to a sensing event; and
   a mat comprising a first row of sensors and a second row of sensors and a control unit, wherein the control unit is operably coupled to the computer and configured to provide computer sensing data responsive to sensing at the first and second row of sensors.

6. The golf simulator of claim 1, wherein the computer is adapted to determine a rough ball speed.

7. The golf simulator of claim 5, wherein the computer is adapted to determine a club head speed and club head path responsive to sensor data provided by the mat.

8. The golf simulator of claim 5, wherein determining the first trajectory comprises:
   determining a rough ball angle;
   determining a rough ball launch angle; and
   determining the first trajectory responsive to the rough ball angle and rough ball launch angle.

9. The golf simulator of claim 1, wherein adjusting the first trajectory responsive to the variations comprises:
   a calculated position using the first trajectory comparing the calculated position to a known position;
   determining a difference responsive to the comparison; and
   modifying the first trajectory respective to the determined difference.

10. The golf simulator of claim 1, wherein determining the variations comprises:
    determining adjustment values responsive to a first predetermined value indicative of an orthogonality of a golf ball to a capture plane of the first camera and a second predetermined value indicative of the orthogonality of the golf ball to a capture plane of the second camera; and
    determining the variations responsive to the determined adjustment values.

11. A computer-implemented method of simulating a golf ball flight path, comprising:
    determining, by a processor, a first trajectory of the golf ball based on a linear expression;
    determining, by the processor, variations based on a flight path of the golf ball according to a first plane and a second plane, the first plane and second plane having orthogonality;
    adjusting, by the processor, the first trajectory based on the variations; and
    providing, for computer simulation, a virtual golf ball with a virtual flight path based on the adjusted first trajectory.

12. A golf simulator, comprising:
    a stereographic image capture system;
    an image capture device; and
    a computer, wherein the computer is adapted to generate simulation data of a golf ball flight path responsive to a club swing event by:
       determining a first launch angle of the golf ball based on a linear expression;
       determining variations responsive to a flight path of the golf ball according to a first plane and a second plane, the first plane and second plane having orthogonality;
       adjusting the first launch angle based on the variations; and
       generating simulation data indicative of a virtual golf ball with a virtual flight path responsive to the adjusted first launch angle.

13. The golf simulator of claim 12, wherein the stereographic image capture system is configured to capture images responsive to a control signal from the computer.

14. The golf simulator of claim 13, wherein the computer is adapted to provide the control signal responsive to detecting a club swing event.

15. The golf simulator of claim 14, wherein the computer is adapted to detect a club swing event responsive to an image provided by the image capture device.

16. The golf simulator of claim 12, wherein the computer is adapted to determine the first launch angle responsive to images captured by the stereographic image capture system.

17. The golf simulator of claim 16, wherein the computer is adapted to determine, responsive to one or more images captured at the image capture device, one or more of a ball launch angle, ball speed, ball spin, club head path, and a club head speed.

18. The golf simulator of claim 17, wherein the computer is adapted to determine a ball trajectory responsive to the ball launch angle, ball angle, and ball speed.

19. A method of simulating a golf ball flight path, comprising:

determining, by a processor, a first launch angle of the golf ball based on a linear expression;

determining, by the processor, variations based on a flight path of the golf ball according to a first plane and a second plane, the first plane and second plane having orthogonality;

adjusting, by the processor, the first launch angle based on the variations; and providing, for computer simulation, a virtual golf ball with a virtual flight path based on the adjusted first launch angle.

20. The method of claim 19, further comprising:

determining, by the processor, a ball angle of the golf ball and a ball speed of the golf ball responsive to a first position at a first time and a second position at a second time; and determining, by the processor, the virtual flight path of the virtual golf ball responsive to the first launch angle, the ball speed, and a ball angle.

* * * * *